United States Patent
Ryu et al.

(10) Patent No.: US 10,560,919 B2
(45) Date of Patent: Feb. 11, 2020

(54) METHOD FOR EXECUTING PAGING SEQUENCE IN WIRELESS COMMUNICATION SYSTEM, AND DEVICE FOR SAME

(71) Applicant: LG ELECTRONICS INC., Seoul (KR)

(72) Inventors: Jinsook Ryu, Seoul (KR); Daewook Byun, Seoul (KR); Sangwook Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/760,979

(22) PCT Filed: Sep. 13, 2016

(86) PCT No.: PCT/KR2016/010320
§ 371 (c)(1),
(2) Date: Mar. 16, 2018

(87) PCT Pub. No.: WO2017/048042
PCT Pub. Date: Mar. 23, 2017

(65) Prior Publication Data
US 2018/0263012 A1    Sep. 13, 2018

Related U.S. Application Data

(60) Provisional application No. 62/219,145, filed on Sep. 16, 2015.

(51) Int. Cl.
*H04W 68/00* (2009.01)
*H04W 68/02* (2009.01)
(Continued)

(52) U.S. Cl.
CPC ............ *H04W 68/02* (2013.01); *H04W 60/00* (2013.01); *H04W 76/28* (2018.02)

(58) Field of Classification Search
CPC ... H04W 68/00; H04W 68/02; H04W 68/025; H04W 52/02; H04W 68/12
(Continued)

(56) References Cited

U.S. PATENT DOCUMENTS

2003/0214937 A1* 11/2003 Lindoff ................. H04W 68/00
370/350
2015/0237577 A1    8/2015 Zhang et al.
(Continued)

FOREIGN PATENT DOCUMENTS

WO    WO 2015/002578 A1    1/2015
WO    WO 2015/105301 A1    7/2015

OTHER PUBLICATIONS

Nokia Networks, "Analysis on IDLE mode extended DRX cycle solutions", R2-153224, 3GPP TSG-RAN WG2 Meeting #91, Beijing, China, Aug. 24-28, 2015, pp. 1-4.
(Continued)

*Primary Examiner* — Dai Phuong
(74) *Attorney, Agent, or Firm* — Birch, Stewart, Kolasch & Birch, LLP

(57) ABSTRACT

In a wireless communication system according to an embodiment of the present invention, in which MME and eNB are unsynchronized, a method for the MME to transmit a paging message to a terminal may comprise: a step for transmitting to the eNB, support information which includes an identifier for the terminal and an eDRX cycle; a step for receiving from the eNB, a Paging Info Response message as a response to the support information, wherein the Paging Info Response message includes the time remaining until the next paging of the terminal, such time being calculated
(Continued)

based on the support information; and a step for setting the remaining time as an initial eDRX timer value, and transmitting the paging message to the eNB when the eDRX timer expires.

6 Claims, 14 Drawing Sheets

(51) Int. Cl.
    *H04W 76/28*     (2018.01)
    *H04W 60/00*     (2009.01)

(58) Field of Classification Search
    USPC ...................................... 455/458–459, 435.1
    See application file for complete search history.

(56) References Cited

U.S. PATENT DOCUMENTS

| | | | |
|---|---|---|---|
| 2016/0050626 A1* | 2/2016 | Chen | H04W 52/0225 |
| | | | 370/311 |
| 2018/0014347 A1* | 1/2018 | Nagasaka | H04W 76/28 |
| 2019/0037488 A1* | 1/2019 | Wang | H04W 68/02 |

OTHER PUBLICATIONS

Samsung, "Signalling for Rel-13 eDRX support", R2-153442, 3GPP TSG RAN WG2 #91, Beijing, P.R. China, Aug. 24-28, 2015, pp. 1-3.

* cited by examiner

[Fig. 1]
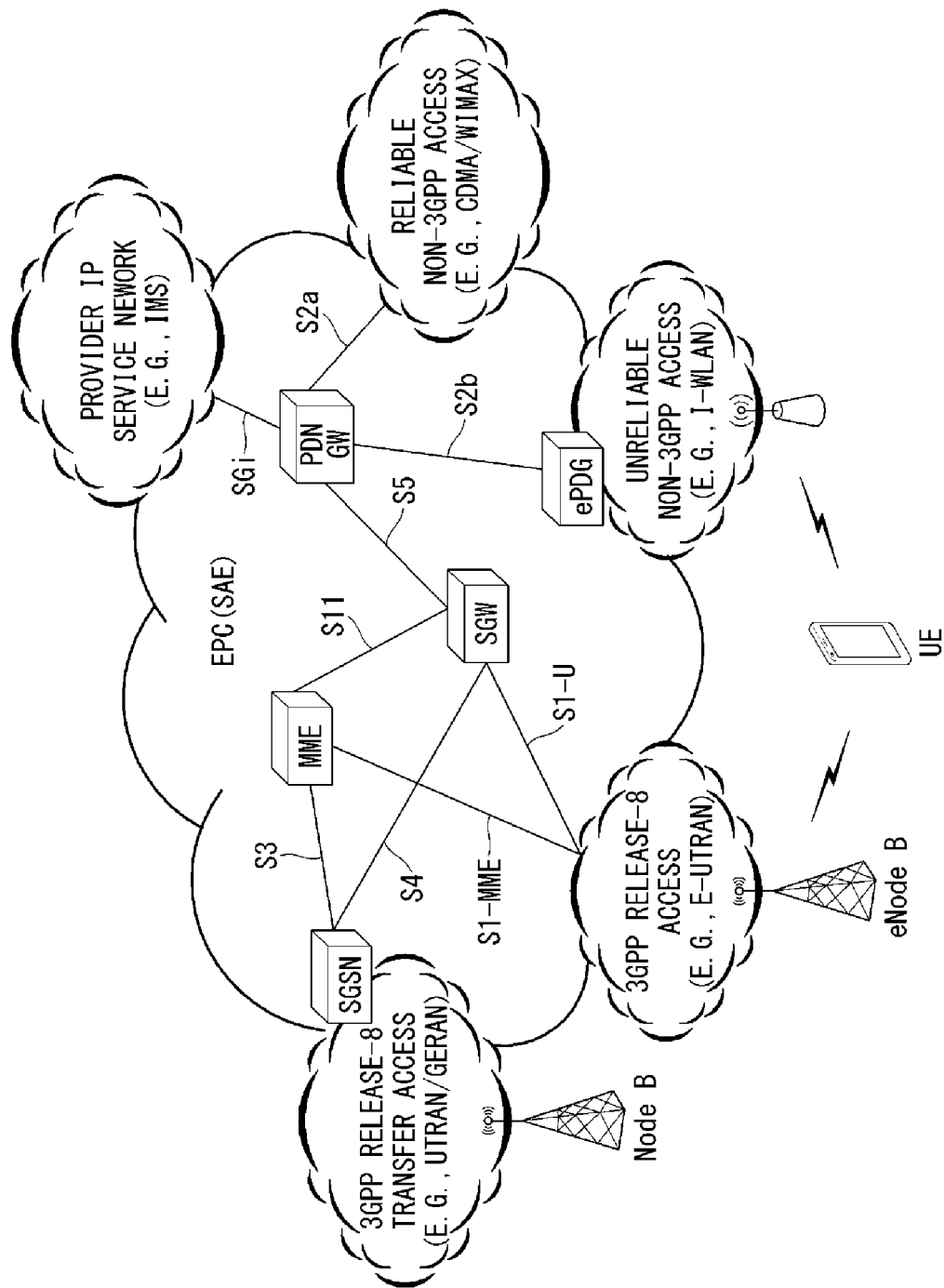

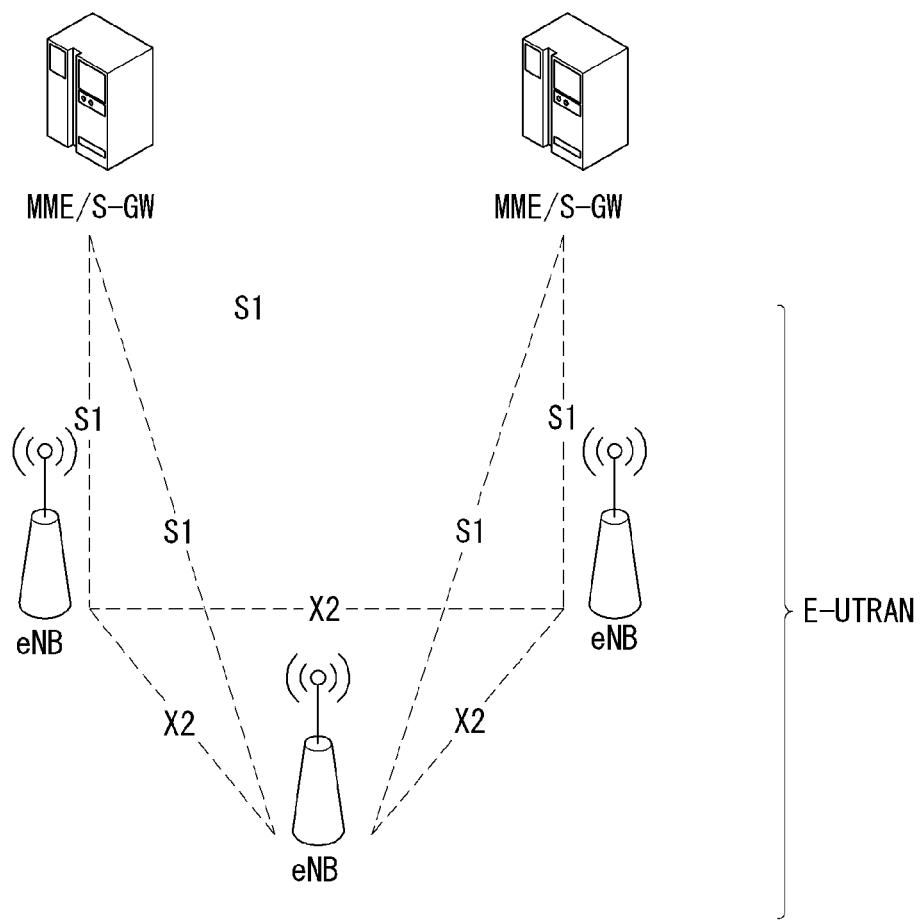
[Fig. 2]

[Fig. 3]
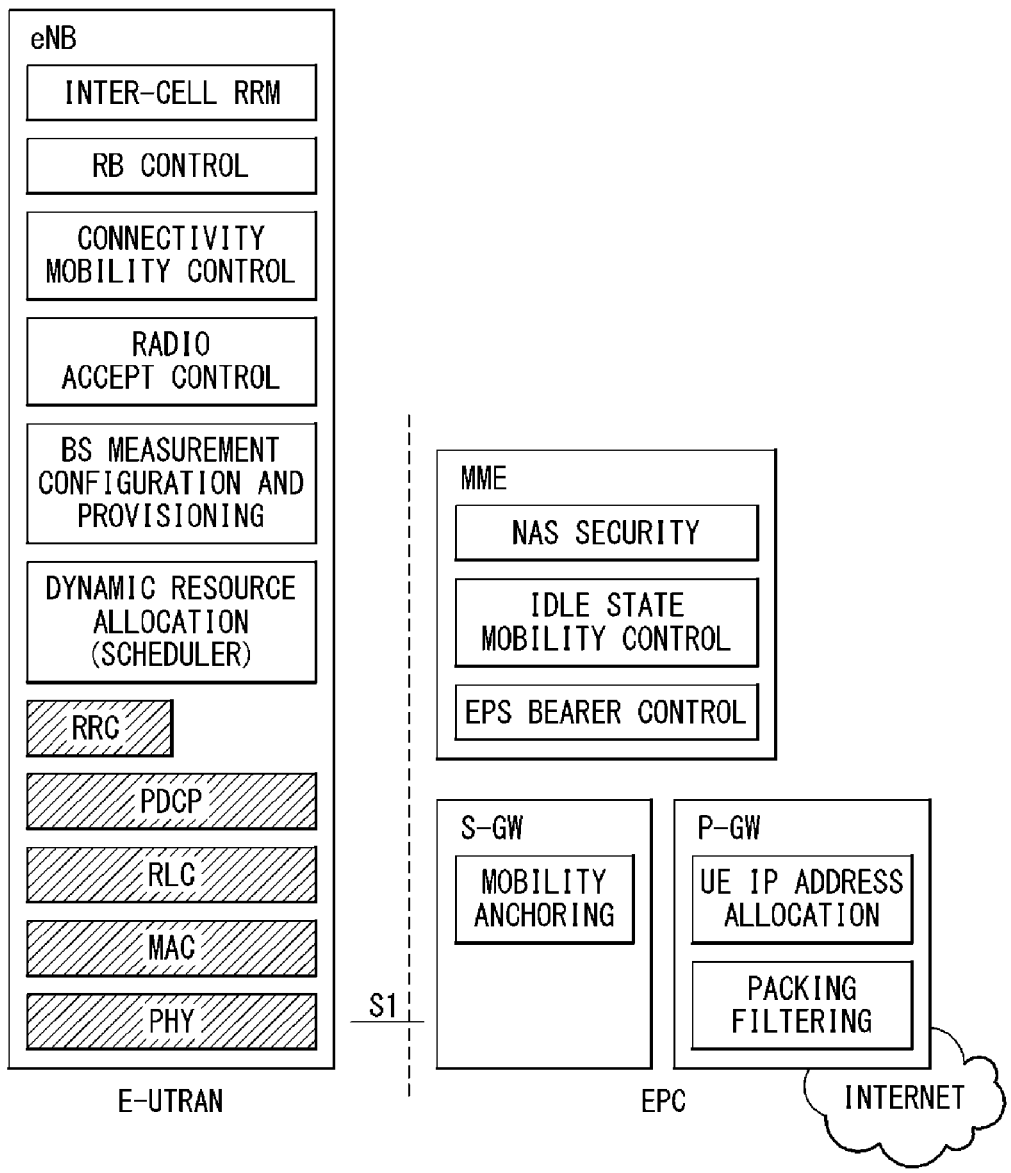

[Fig. 4]
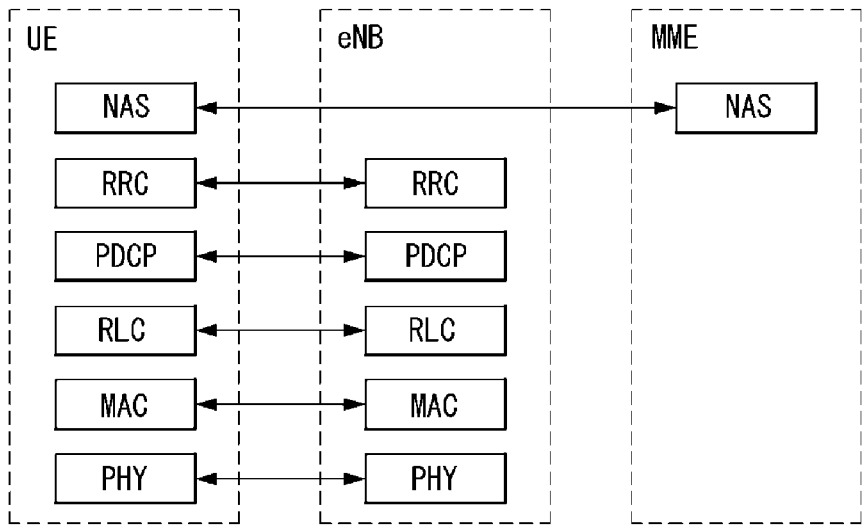
(a) CONTROL PLANE PROTOCOL STACK
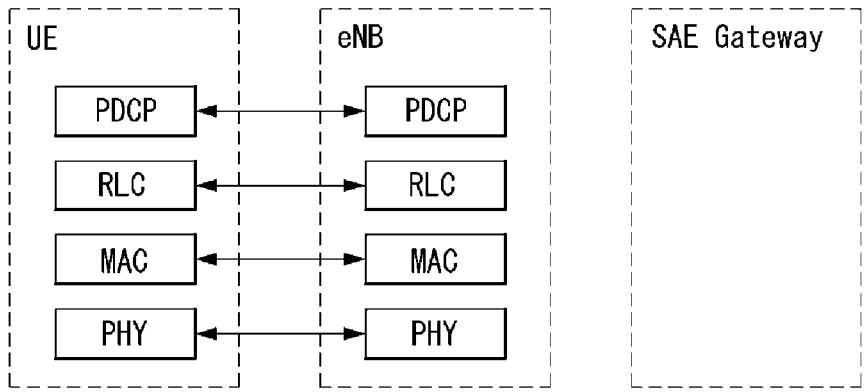
(b) USER PLANE PROTOCOL STACK
[Fig. 5]
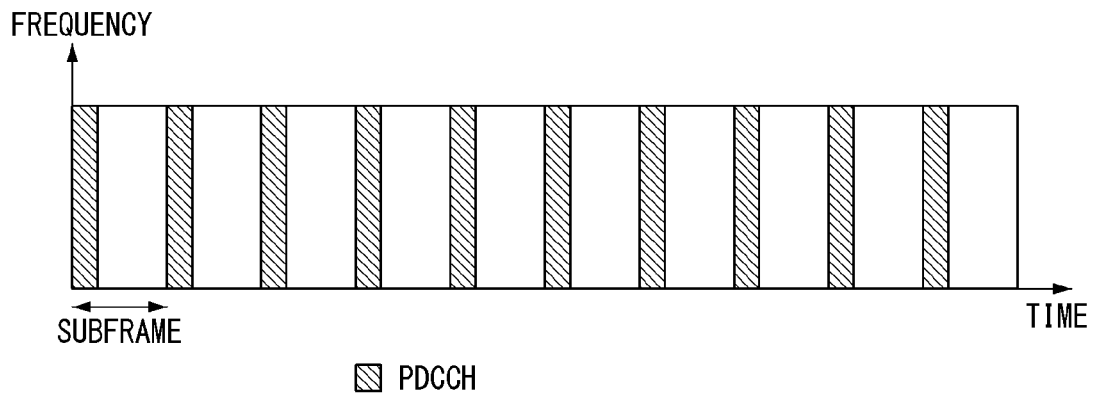

[Fig. 6]
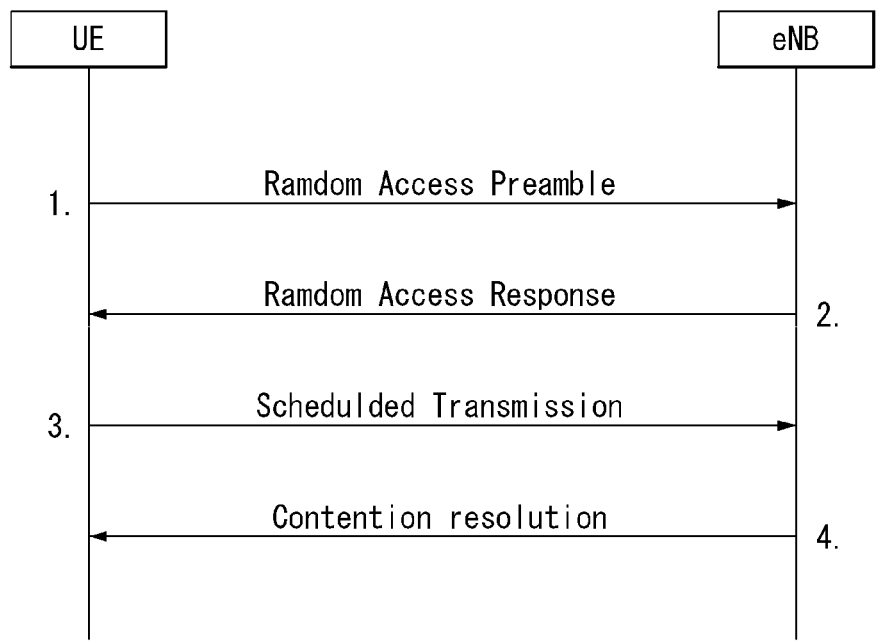

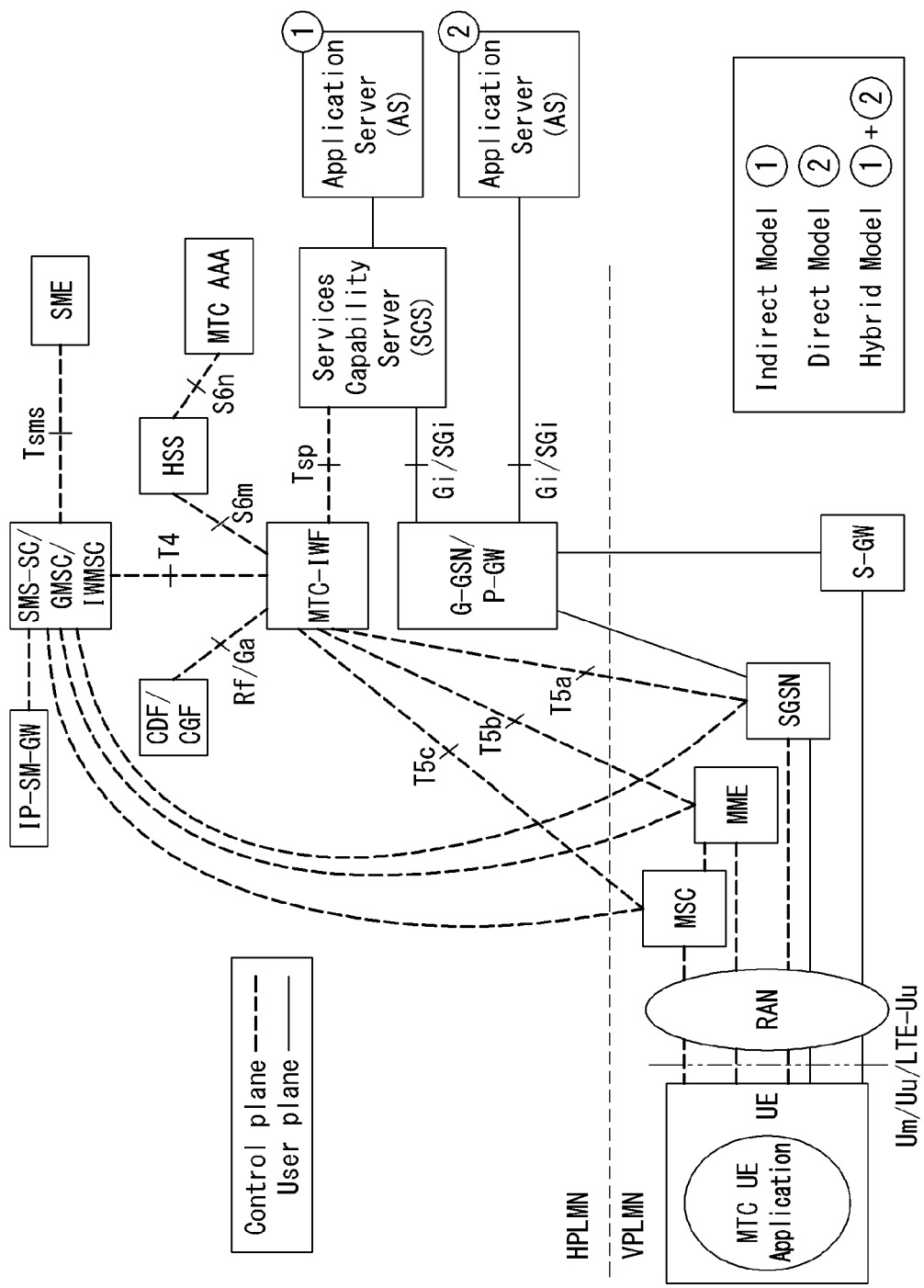
[Fig. 7]

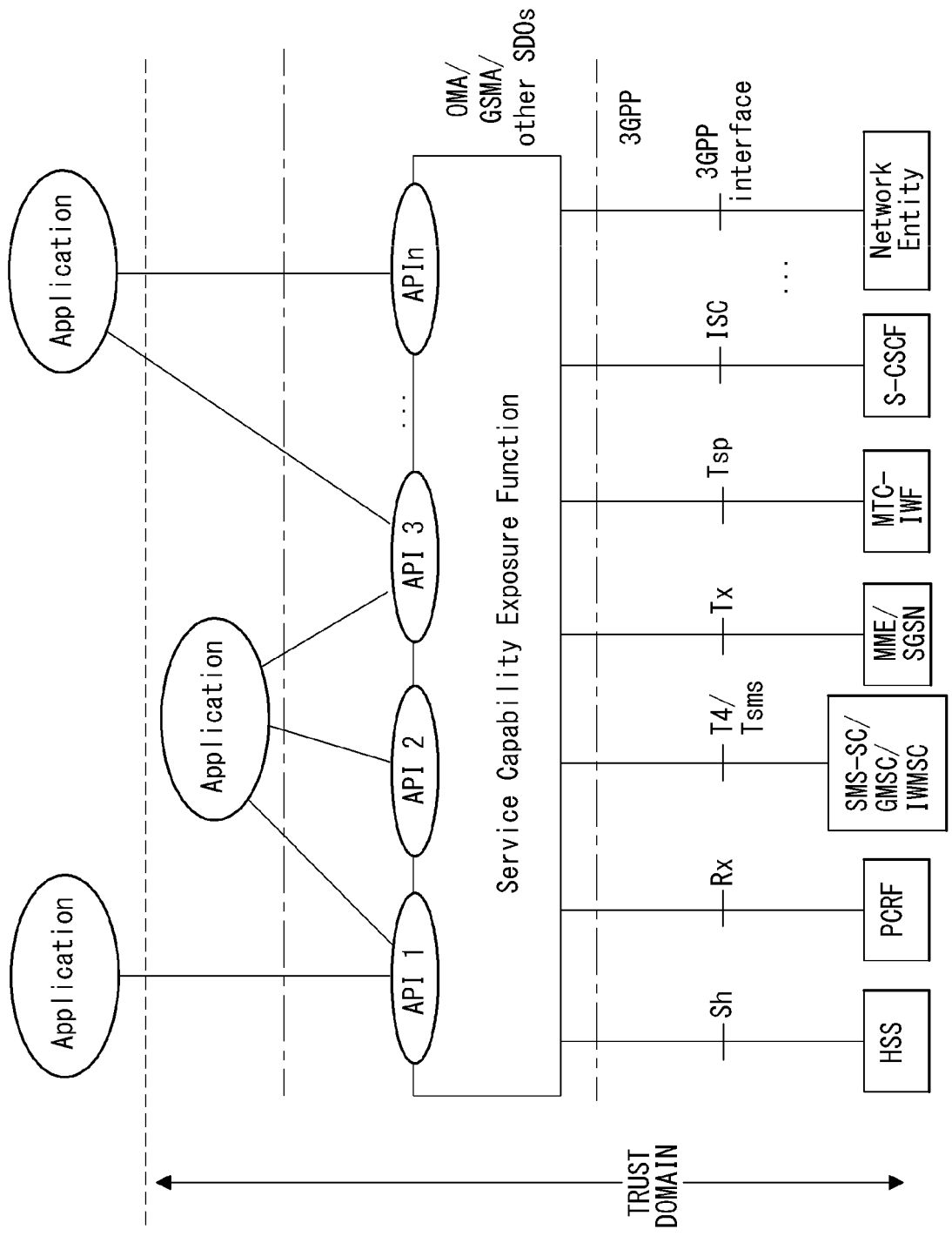
[Fig. 8]

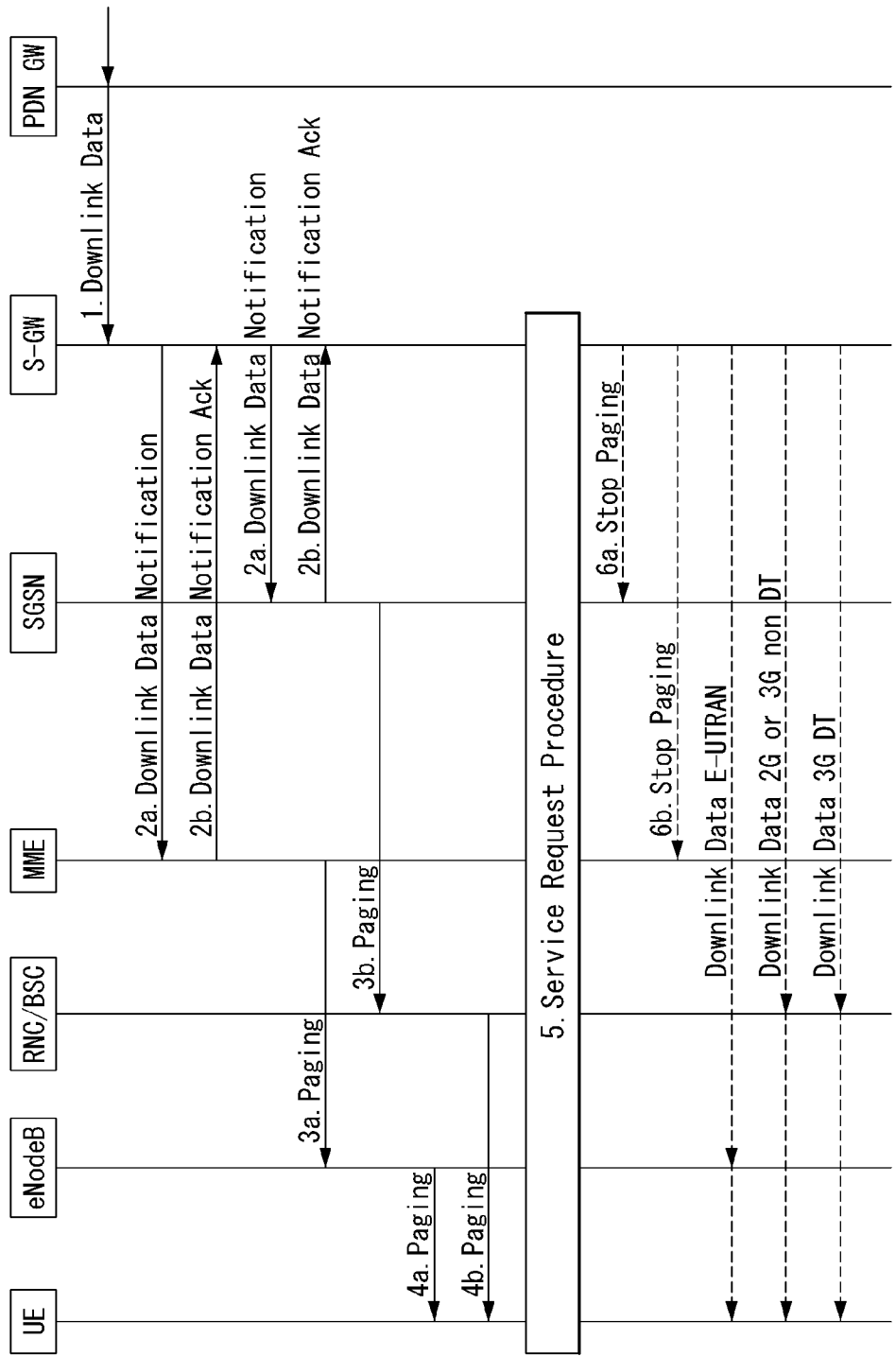
[Fig. 9]

[Fig. 10]
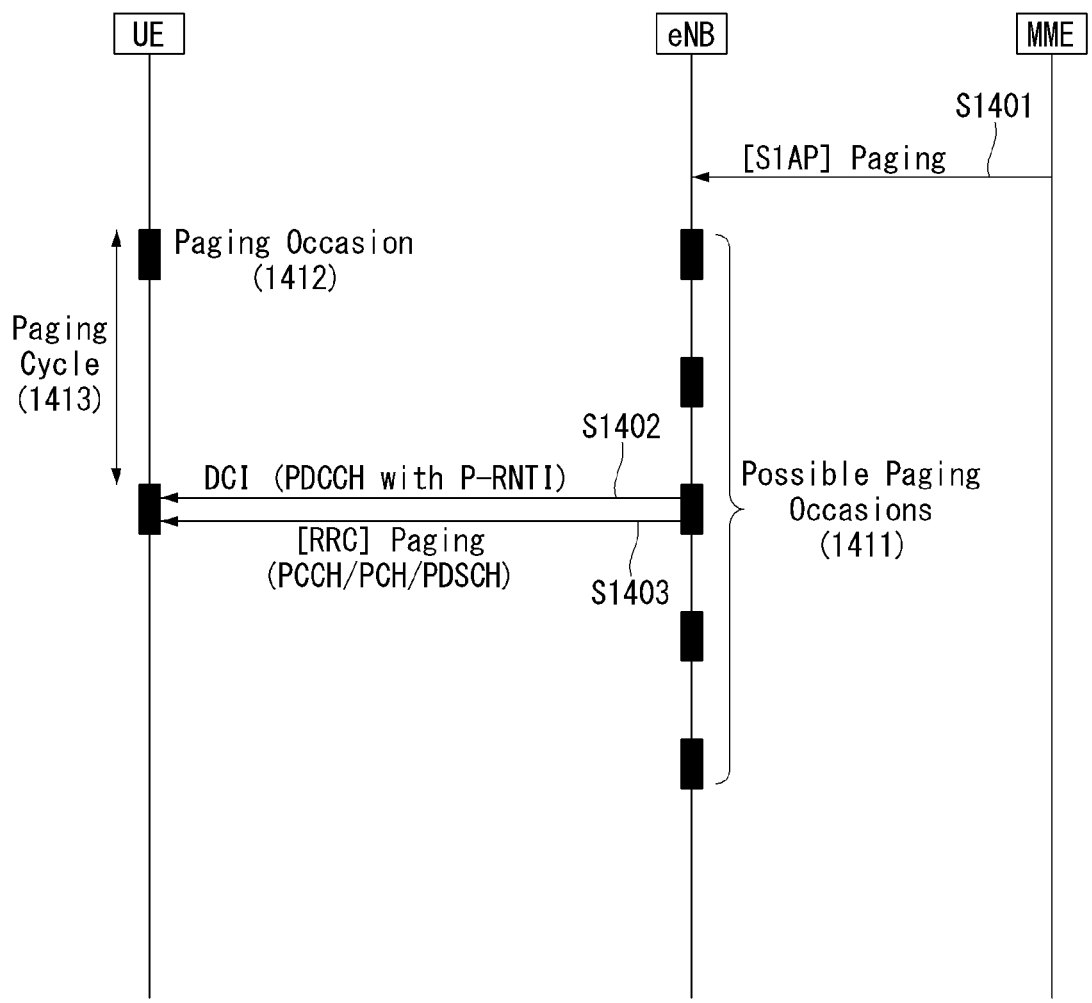

[Fig. 11]
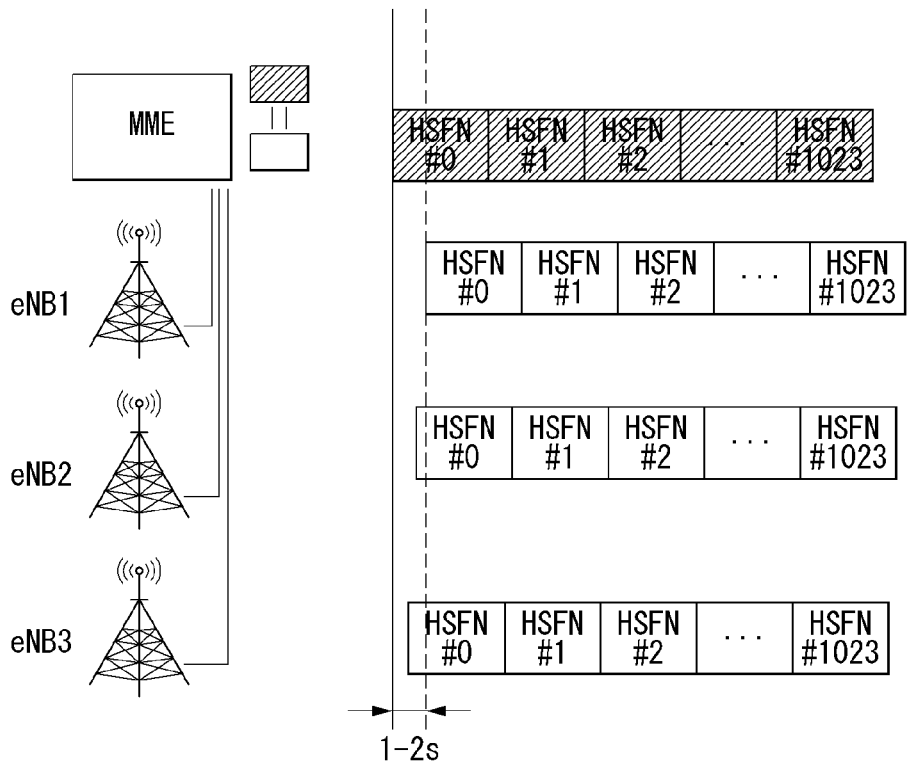
[Fig. 12]
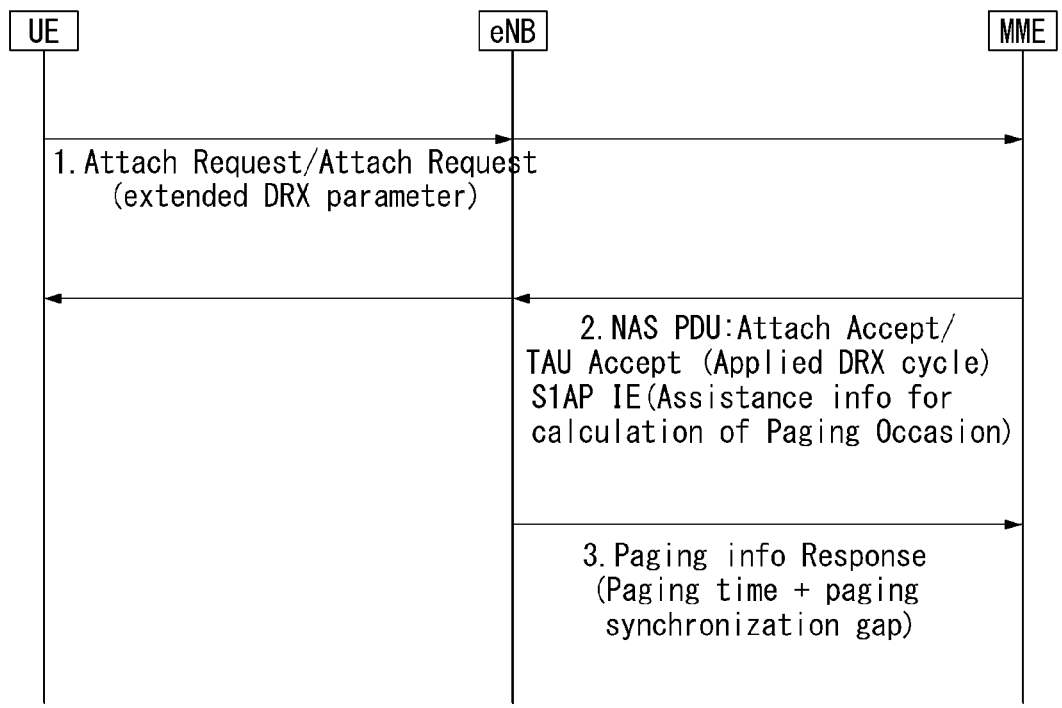

[Fig. 13]
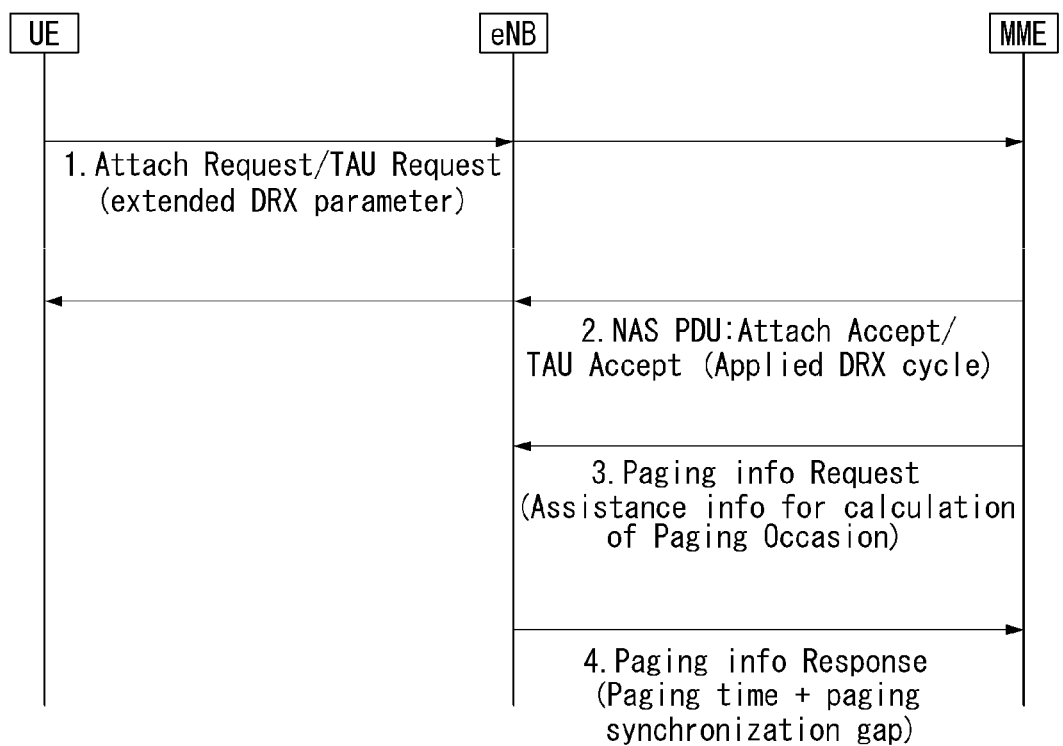

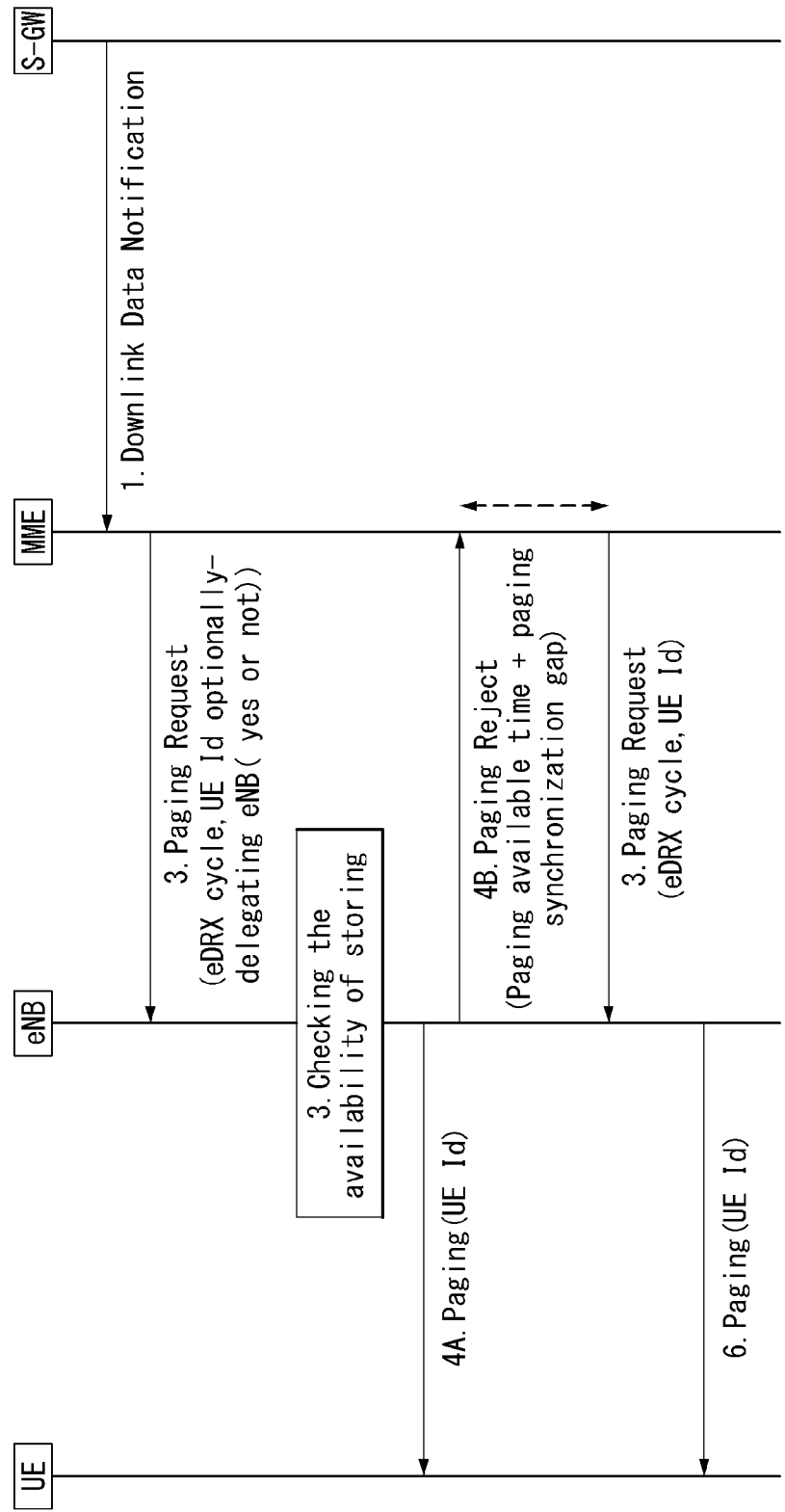
[Fig. 14]

[Fig. 15]
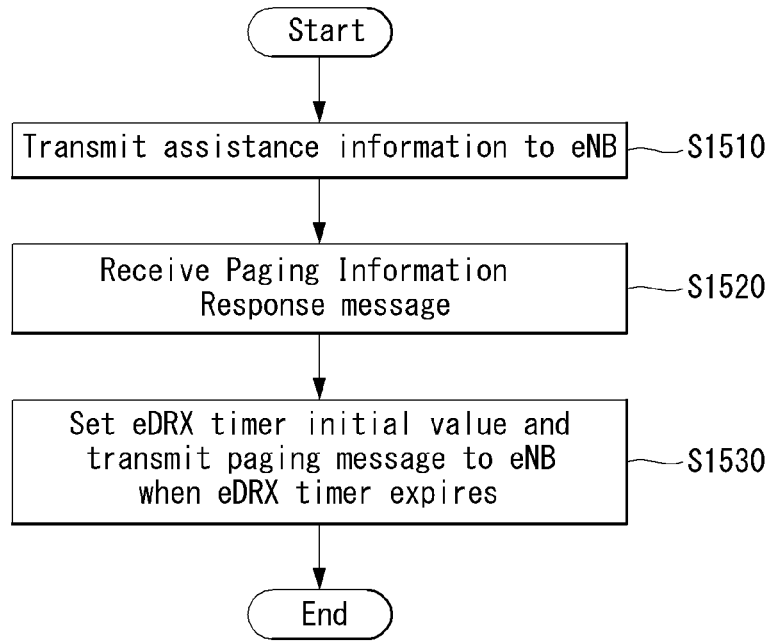
[Fig. 16]
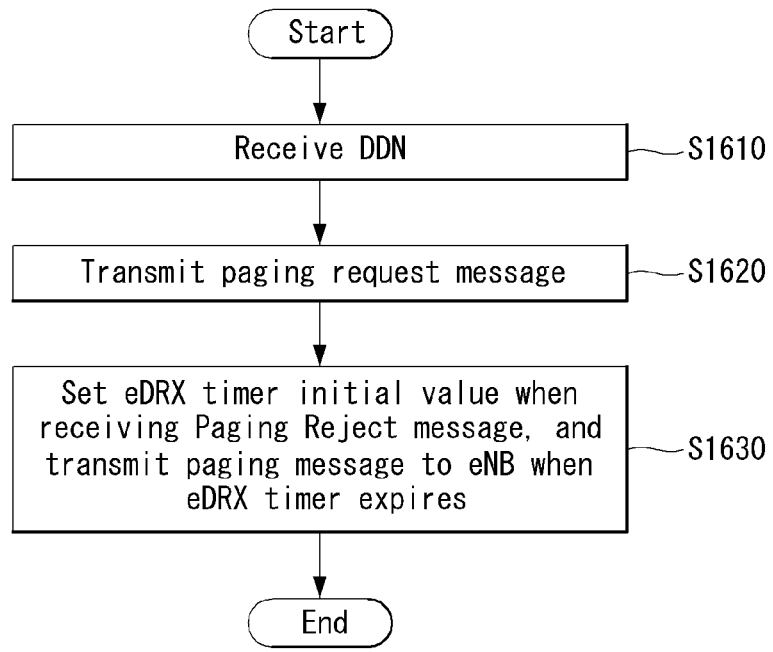

[Fig. 17]
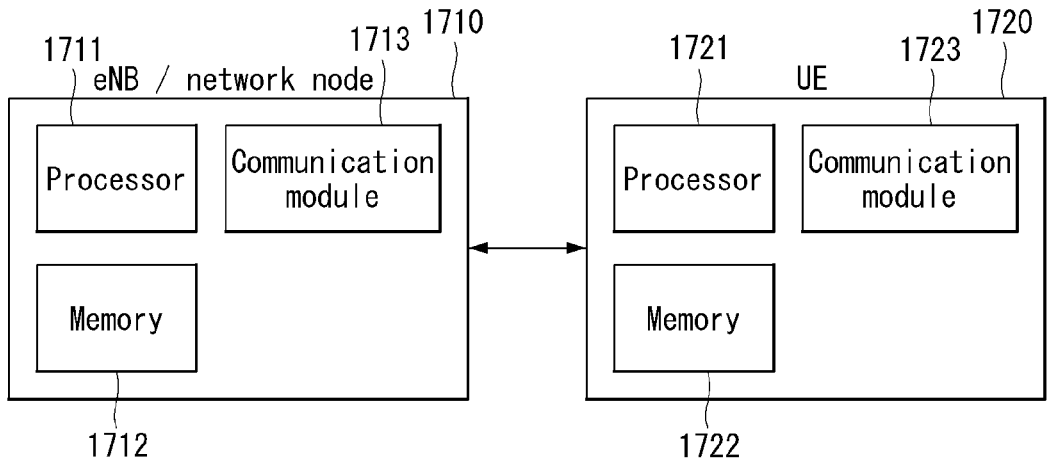
[Fig. 18]
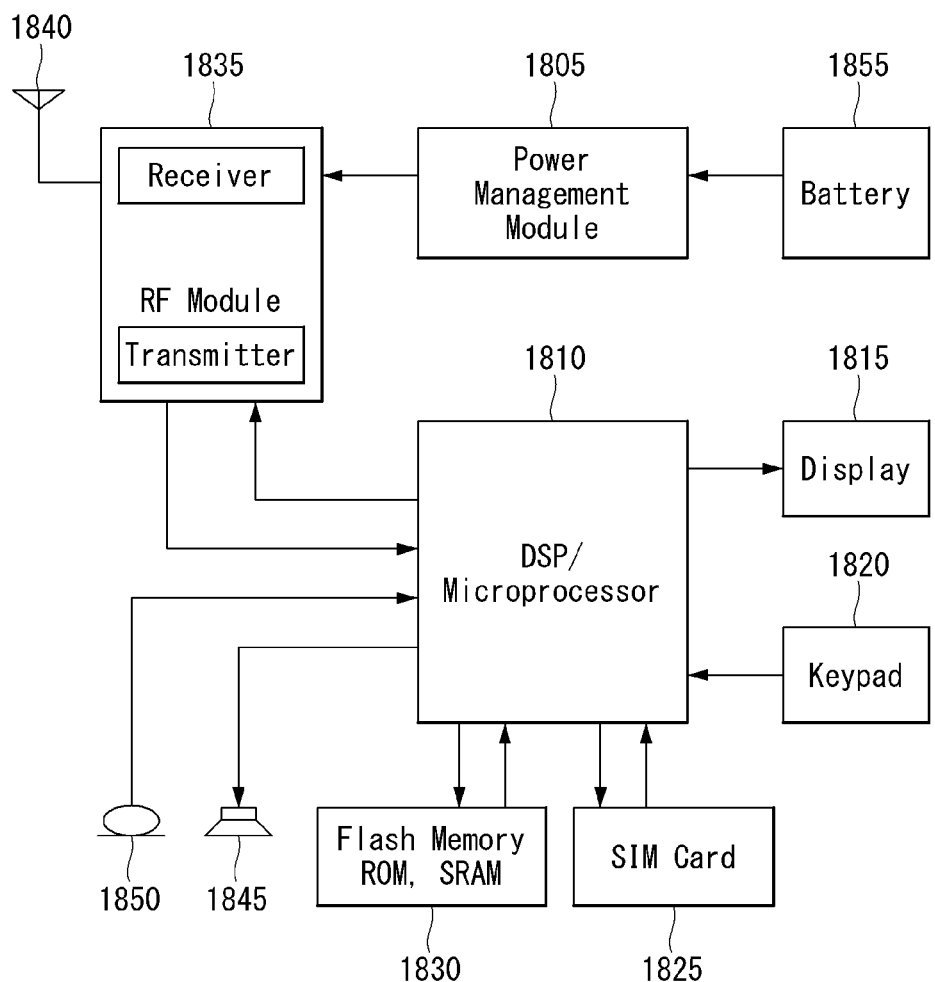

METHOD FOR EXECUTING PAGING SEQUENCE IN WIRELESS COMMUNICATION SYSTEM, AND DEVICE FOR SAME

CROSS REFERENCE TO RELATED APPLICATIONS

This application is the National Phase of PCT International Application No. PCT/KR2016/010320, filed on Sep. 13, 2016, which claims priority under 35 U.S.C. 119(e) to U.S. Provisional Application No. 62/219,145, filed on Sep. 16, 2015, all of which are hereby expressly incorporated by reference into the present application.

TECHNICAL FIELD

The present invention relates to a wireless communication system and, more particularly, to a method for an MME to transmit a paging message to a UE in an asynchronous environment with an eNB and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to minimize the time taken for an eNB to store/buffer a paging message transmitted by an MME in such a manner that the MME transmits the paging message to the eNB at an appropriate occasion in an asynchronous environment in which the MME and the eNB are out of synchronization.

Technical objects to be achieved by the present invention are not limited to the aforementioned technical objects, and other technical objects not described above may be evidently understood by a person having ordinary skill in the art to which the present invention pertains from the following description.

Technical Solution

In an embodiment of the present invention, a method for a mobility management entity (MME) to transmit a paging message to a UE in a wireless communication system where the MME and an evolved-nodeB (eNB) are asynchronous may include the steps of transmitting assistance information including an ID of the UE and an extended discontinuous reception (eDRX) cycle to the eNB; receiving a paging information response message from the eNB as a response to the assistance information, wherein the paging information response message includes a remaining time up to a next paging occasion of the UE calculated based on the assistance information; and setting the remaining time as an eDRX timer initial value and transmitting the paging message to the eNB when the eDRX timer expires.

Furthermore, the paging information response message may further include a paging synchronization gap value which is a maximum error value between the paging occasions of eNBs at which the paging occasion of the eNB may be considered to have been synchronized with the paging occasions of other eNBs.

Furthermore, when the remaining time and the paging synchronization gap value are received through the paging information response message, the step of transmitting the paging message to the eNB may be the step of setting the eDRX timer initial value by taking into consideration the remaining time and the paging synchronization gap value and transmitting the paging message to the eNB when the eDRX timer expires.

Furthermore, the assistance information may be included in an attach accept message in an attach procedure or a TAU accept message in a TAU procedure and transmitted to the eNB.

Furthermore, the assistance information may be included in an information element (IE) of an S1AP message used to transmit the attach accept message or the TAU accept message and transmitted to the eNB.

Furthermore, the assistance information may be included in a paging information request message and transmitted to the eNB.

Furthermore, the method for the MME to transmit the paging message may further include the step of resetting the eDRX timer as the eDRX cycle when the eDRX timer set as the eDRX timer initial value expires.

Furthermore, in another embodiment of the present invention, a method for a mobility management entity (MME) to transmit a paging message to a UE in a wireless communication system where the MME and an evolved-nodeB (eNB) are asynchronous may include the steps of receiving downlink data notification (DDN) from a serving gateway (S-GW); transmitting a paging request message including assistance information about an ID of the UE and an eDRX cycle to an evolved_nodeB (eNB); and setting the remaining time as an eDRX timer initial value when a paging reject message including the remaining time up to a next paging occasion of the UE is received from the eNB, and transmitting the paging message to the eNB when the eDRX timer expires.

Furthermore, the paging reject message may further include a paging synchronization gap value, that is, a maximum error value between the paging occasions of eNBs at which the paging occasion of the eNB may be considered to have been synchronized with the paging occasions of other eNBs.

Furthermore, when the remaining time and the a paging synchronization gap value are received through the paging reject message, the step of transmitting the paging message to the eNB may be the step of setting the eDRX timer initial value by taking into consideration the remaining time and the paging synchronization gap value and transmitting the paging message to the eNB when the eDRX timer expires.

Furthermore, if the MME has transmitted the paging request message to other eNBs whose paging occasions have been synchronized with the paging occasion of the eNB, an eNB transmitting the paging reject message may correspond to a representative eNB transmitting the paging reject message on behalf of the other eNBs.

Furthermore, if the representative eNB has been previously designated, the paging request message may further include an indicator indicating whether the eNB corresponds to the representative eNB.

Furthermore, in another embodiment of the present invention, a method for an evolved_nodeB (eNB) to deliver a paging message transmitted by a mobility management entity (MME) to a UE in a wireless communication system where the MME and an evolved-nodeB (eNB) are asynchronous includes the steps of receiving a the paging message including assistance information about an ID of the UE and an extended discontinuous reception (eDRX) cycle from the mobility management entity (MME); calculating the remaining time up to a next paging occasion of the UE based on the assistance information; comparing the remaining time with a paging message storage availability time of the eNB; storing the paging message if the remaining time is smaller than the storage availability time and transmitting the paging message to the UE at the next paging occasion of the UE; and transmitting a paging reject message to the MME if the remaining time is greater than the storage availability time, wherein the paging reject message may include the calculated remaining time up to the next paging occasion of the UE.

Furthermore, the paging rejection message may further include a paging synchronization gap value, that is, a maximum error value between the paging occasions of eNBs at which the paging occasion of the eNB may be considered to have been synchronized with the paging occasions of other eNBs.

Advantageous Effects

In accordance with an embodiment of the present invention, the MME directly calculates the paging occasion of a UE using information received from an eNB and transmits a paging message to the eNB at the corresponding occasion. Accordingly, the eNB can deliver/transmit the paging message, received from the MME, to the UE directly or within a very short time. As a result, the paging message storage/buffering time of the eNB is minimized.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention can be applied.

FIG. 2 illustrates an example of evolved universal terrestrial radio access network structure to which the present invention can be applied.

FIG. 3 exemplifies a structure of E-UTRAN and EPC in a wireless communication system to which the present invention can be applied.

FIG. 4 illustrates the structure of a radio interface protocol between a UE and E-UTRAN in a wireless communication system to which the present invention can be applied.

FIG. 5 is a diagram schematically showing the structure of a physical channel in a wireless communication system to which the present invention may be applied.

FIG. 6 is a diagram for describing a contention based random access procedure in a wireless communication system to which the present invention may be applied.

FIG. 7 illustrates architecture for service capability exposure in a wireless communication system to which the present invention may be applied.

FIG. 8 illustrates architecture for service capability exposure in a wireless communication system to which the present invention may be applied.

FIG. 9 is a diagram illustrating a network triggered-service request procedure in a wireless communication system to which the present invention may be applied.

FIG. 10 is a diagram illustrating a paging procedure in a wireless communication system to which the present invention may be applied.

FIG. 11 is a diagram showing synchronization between an MME and an eNB.

FIG. 12 is a flowchart illustrating a method for the MME to operate an eDRX timer according to a first embodiment of the present invention.

FIG. 13 is a flowchart illustrating a method for the MME to operate the eDRX timer according to a second embodiment of the present invention.

FIG. 14 is a flowchart illustrating a method for the MME to operate the eDRX timer according to a third embodiment.

FIG. 15 is a flowchart illustrating an operating method of the MME according to an embodiment of the present invention.

FIG. 16 is a flowchart illustrating an operating method of the MME according to an embodiment of the present invention.

FIG. 17 illustrates a block diagram of a communication apparatus according to an embodiment of the present invention.

FIG. 18 illustrates a block diagram of a communication apparatus according to an embodiment of the present invention.

BEST MODE

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.
Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention May be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Power Saving Mode

The Power Saving Mode (PSM) is a function to minimize power consumption of the UE by defining an interval in which one UE disables access stratum (AS) operations including paging reception and mobility management as one of 3GPP release-12 (rel-12) advanced MTC (enhancements for MTC) (MTCe)) features. That is, the UE that supports the PSM agrees or receives an active time and a periodic TAU timer (P-TAU) with or from the network during attach and tracking area update (TAU).

When receiving the Active Time value from the network, in the case where the UE is switched from ECM-CONNECTED to ECM-IDLE, the UE maintains the ECM-IDLE state to receive the paging during the corresponding Active Time. Then, when the Active Time expires, the UE enters the PSM and stops all Access Stratum (AS) operations.

In addition, the MME starts an active timer with the Active Time value every time the UE enters the ECM-IDLE mode. In addition, when the active timer expires, the MME deduces that the UE is unreachable.

That is, Active Time refers to a time when the UE supporting a state (for example, the power saving mode (PSM), etc.) using a power saving function maintains the ECM-IDLE (or RRC_IDLE) state.

When the periodic TAU timer expires, the UE enables the AS operation and performs the TAU again and the network stops an implicit detach timer of the corresponding UE. The UE may wake up at any time when a user wants for a mobile originated call (e.g., uplink data packet transfer), etc.

On the contrary, for a mobile terminated call (e.g., downlink data packet receiving), etc., the UE wakes up every P-TAU period to perform the TAU and performs a paging receiving operation for the active time received at that time and thereafter, enters the PSM again to sleep.

Discontinuous Reception (DRX) Mode

In the 3GPP LTE/LTE-A system, an EPS connection management (ECM)-connected state and the ECM-IDLE state are defined in order to manage the signaling connection between the UE and the network. The ECM connected state and the ECM idle state may also be applied to the UE and the MME. The ECM connection is comprised of the RRC connection established between the UE and the eNB and the S1 signaling connection established between the eNB and the MME. The RRC state indicates whether the RRC layer of the UE and the RRC layer of the eNB are logically connected. That is, when the RRC layer of the UE and the RRC layer of the eNB are connected, the UE is in the RRC_CONNECTED state. When the RRC layer of the UE and the RRC layer of the eNB are not connected, the UE is in the RRC_IDLE state.

Herein, the RRC_CONNECTED state means a state in which the UE may receive a service on a cell basis while the UE is connected to a specific cell and the UE is managed on the cell basis.

In the RRC_IDLE state, the UE is managed by the unit of a tracking area (TA), which is a larger area unit than the cell in a state in which the UE has no connection with the eNB and only maintains a connection with the Mobility Management Entity (MME). That is, the UE in the RRC_IDLE state intermittently wakes up to monitor a paging channel (PCH) to check whether there is a paging message transmitted to the UE. That is, the UE performs discontinuous reception (DRX) set by a non-access stratum (NAS) using an ID uniquely allocated in the tracking area. The UE may receive broadcasts of system information and paging information by monitoring the paging signal at a specific paging time for each UE-specific paging DRX cycle. In addition, the UE checks whether a reception signal and when the identifier of the UE is included in the paging channel, the UE is switched to the RRC_CONNECTE mode through the service request procedure. Through such a network state definition, UE without an enabled service may minimizes power consumption thereof and the eNB may efficiently use the resources.

As described above, in order for the UE to receive A normal mobile communication service such as voice or data, the UE needs to transit to the ECM connected state. The initial UE is in the ECM idle state as in the case where the UE is first turned on and when the UE is successfully registered in the corresponding network through the initial attach procedure, the UE and the MME transit to the ECM connected state. Further, when the UE is registered in the network but the traffic is inactivated and the radio resource is not thus allocated, the UE is in the ECM idle state and when new uplink or downlink traffic is generated in the UE, the UE and the MME transit to the ECM connected state.

The 3GPP LTE/LTE-A system uses a discontinuous reception (DRX) technique of the UE in order to minimize the power.

The DRX defined in the 3GPP LTE/LTE-A system may be used both in the dormant mode and in the RRC_IDLE state of the UE.

The UE may perform monitoring of the PDCCH based on RNTI (e.g., C-RNTI, SI-RNTI, P-RNTI, etc.) which is a unique identifier of the UE.

The monitoring of the PDCCH may be controlled by the DRX operation and the parameter related to the DRX is transmitted to the UE by the RRC message. When the DRX parameter is configured in the state where the UE is the RRC connected state, the UE performs discontinuous monitoring of the PDCCH based on the DRX operation. On the contrary, when the DRX parameter is not configured, the UE performs continuous PDCCH monitoring.

Further, as described above, the UE receiving the paging message may perform the DRX for the purpose of reducing the power consumption.

To this end, the network configures a plurality of paging occasions for each time cycle called a paging cycle and a specific UE receives the paging message only at a specific paging time, and the UE does not receive the paging channel at occasions other than the specific paging occasion. Further, one paging occasion may correspond to one TTI.

The extended idle mode DRX (eDRX: extended DRX) increases the existing maximum 2.56 s paging DRX cycle to several minutes to several tens of minutes to minimize the power consumption of the UE. The eDRX may be applied to the idle mode and the connected mode. The extended idle mode DRX applied to the connected mode is relatively shorter than the DRX applied in the idle mode, such as up to 10.24 s.

In the case of the UE supporting the eDRX mode, an unreachable state of the UE may mean an unreachable state (i.e., a DRX period in which the UE does not monitor the paging channel) due to paging.

On the contrary, in the case of the UE supporting the eDRX mode, a state in which the UE is reachable may mean the ECM-CONNECTED mode and/or a state in which the UE is immediately reachable by paging (i.e., a period in which the UE monitors the paging channel).

In other words, it may be determined that the eDRX is temporarily unreachable even the idle period because the eDRX period is relatively longer than the normal DRX period. In other words, data may be delivered up to 2.56 seconds after normal DRX (2.56 seconds) is supported, but when the eDRX (e.g., 10 minutes) is applied, the maximum delay is 10 minutes, and as a result, immediate data delivery is unavailable and the unavailable data delivery may be regarded as substantially unreachable.

The UE and the network may negotiate the use of the extended idle mode DRX through NAS signaling to reduce the power consumption of the UE. The UE applying the extended idle mode DRX may use mobile terminating data and/or a network originated procedure within a delay of a specific time depending on the DRX cycle value.

The UE that desires to use the extended idle mode DRX (in particular, a UE side application) needs to specially control a mobile terminating service or data delivery and in particular, the corresponding UE needs to consider delay tolerance of the mobile terminating data. The network (in particular, a network side application) may transmit the mobile terminating data, SMS or device trigger and needs to know whether the extended idle mode DRX is ready. The UE needs to the extended idle mode DRX only in the case where all expected mobile terminating communication is tolerant to the delay.

In order to negotiate the use of the extended idle mode DRX, the UE requests extended idle mode DRX parameters during the Attach procedure and the RAU/TAU procedure. The SGSN/MME may reject or accept the request of the UE for the extended idle mode DRX. When the SGSN/MME accepts the extended idle mode DRX, the SGSN/MME may provide a value different from the extended idle mode DRX parameter requested by the UE based on an operator policy. When the SGSN/MME accepts the use of the extended idle mode DRX, the UE applies the extended idle mode DRX based on the received extended idle mode DRX parameters. When the SGSN/MME rejects the request or when the UE does not receive the extended idle mode DRX parameter within the associated accept message due to reception of the request by the SGSN/MME which does not support he extended idle mode DRX, the UE applies the existing DRX.

When the UE requests both the power saving mode (PSM) (active time and/or periodic TAU timer (T-PAU) request) and the extended idle mode DRX through the NAS, the SGSN/MME may make a determination as follows.

Enabling the PSM only (i.e., rejecting the request for the extended idle mode DRX)

Enabling the extended idle mode DRX only (i.e., rejecting the request for the active time)

Enabling both the PSM (i.e., providing the active time) and the extended idle mode DRX (i.e., providing the extended idle mode DRX parameters)

When one of the three is determined and the associated parameters (i.e., active time, P-TAU timer, and/or extended idle mode DRX cycle value) are provided to the terminal, the next Attach or RAU/TAU procedure is initiated and is used until any one of the three is newly determined. If both the extended idle mode DRX and the PSM are enabled, the extended idle mode DRX cycle may be set to have the plurality of paging occasions while the active timer is driven.

If the PSM active time provided by the UE is greater than the extended idle mode DRX cycle, the SGSN/MME may enable both the PSM and the extended idle mode DRX. This may minimize the power consumption of the UE during the active time.

Paging for Extended Idle Mode DRX

Hereinafter, a method of determining a paging occasion for a UE adopting eDRX is described.

When a UE adopts extended idle mode DRX, the UE is reachable by paging in a specific paging hyperframe (PH).

The PH means a specific set of hyper-system frame number (H-SFN) values. The PH may be calculated using an extended idle mode DRX cycle and a UE-specific identifier (e.g., IMSI).

H-SFN frame architecture is defined by the highest value of the SFN used for common idle mode DRX. That is, one hyperframe consists of 1024 radio frames (i.e., 10.24 seconds). Accordingly, when the SFN is wrapped around, the H-SFN is increased by 1.

The extended idle mode DRX cycle value starts from 5.12 seconds (i.e., 5.12, 10.24 or 20.48 seconds) and may be increased two times up to a maximum of 2621.44 seconds (43.69 minutes).

The PH value may be calculated in all of UEs and MME/SGSN(s) without any signaling. The MME/SGSN includes an extended idle mode DRX cycle length in a paging message in order to support that an eNB pages a corresponding UE.

The MME/SGSN also assigns a paging time window (PTW) (or paging window (PW)) length and provides the UE with a PTW length value along with the extended idle mode DRX cycle length during an Attach and/or TAU procedure.

The first paging occasion (PO) of the UE is included in the PH. After the first PO, the UE is assumed to be reachable by paging during an additional PTW length. After the PTW length, the MME/SGSN may consider the corresponding UE to be unreachable by paging until a next PH.

An extended DRX (eDRX) cycle "T_eDRX" may be configured in the UE by a high layer (e.g., RRC layer). The UE may operate in the eDRX mode only when a cell indicates that it supports eDRX within system information.

If the T_eDRX cycle of the UE is set as 512 radio frames (i.e., 5.12 seconds), the UE applies 512 to a DRX cycle "T" value and monitors a defined paging occasion (PO).

Otherwise, "T" is determined to be the shortest value of a UE-specific DRX cycle (if it is allocated by a high layer) and a default paging cycle ("defaultPagingCycle" field value) broadcasted by system information. Furthermore, the UE in which the eDRX mode has been configured monitors a PO based on the determined "T" value during a configured periodic paging window.

A paging window (i.e., PTW) is configured in a UE-specific manner and is determined by a paging hyperframe (PH), a starting occasion "PW_start" within the PH, and an ending occasion "PW_ending" within the PH.

PH, PW_start and PW_end are determined as follows.

The PH is an H-SFN that satisfies Equation 1.

$$H\text{-SFN mod } T\_(eDRX,H) = (UE\_ID \text{ mod } T\_(eDRX,H)) \quad \text{[Equation 1]}$$

In Equation 1, UE_ID indicates (IMSI mod 1024). T_eDRX,H is the eDRX cycle (T_eDRX,H=1, 2, ..., 256 hyperframe(s)) of the UE expressed as a hyperframe and configured by a high layer.

PW_start is the first radio frame of the PH that is part of a paging window and is a system frame number (SFN) satisfying Equation 2.

$$SFN = 256 * i\_eDRX \quad \text{[Equation 2]}$$

In Equation 2, i_eDRX=floor(UE_ID/T_eDRX,H) mod 4. In this case, floor (x) operation means a maximum integer not greater than x.

PW_end is the last radio frame of the paging window and is a system frame number (SFN) satisfying Equation 5.

$$SFN = (PW\_start + L*100 - 1) \text{ mod } 1024 \quad \text{[Equation 3]}$$

In this case, L is a paging window length (second unit) configured by a high layer.

That is, a paging hyperframe (PH) is configured in the UE for each eDRX cycle (T_eDRX,H) (i.e., 5.12, 10.24, ..., 2621.44 seconds) expressed as a hyperframe. Furthermore, a paging time window (or paging window) is configured in the UE from PW_start to PW_end within the PH. Furthermore, the UE monitors paging at a paging occasion (PO) (i.e., if the eDRX cycle is 512 radio frames) calculated based on the eDRX cycle of the UE within the configured paging window or the paging occasion (PO) (i.e., if the eDRX cycle is not 512 radio frames) calculated based on a common DRX cycle and a default paging cycle.

As described above, the MME/SGSN may calculate the paging occasion of a corresponding UE. In this case, the MME/SGSN may assume that synchronization has been performed 2.56 seconds or less through loose synchronization with the eNB.

The MME/SGSN may transmit an S1AP paging message, together with the PTW value, at the paging occasion calculated as described above so that the UE can receive paging reliably.

In this case, the PTW corresponds to time corresponding to several times of common paging (maximum 2.56 seconds). When the eNB receives the PTW within the S1AP paging message, it repeatedly transmits an RRC paging message to the corresponding UE at intervals of a common paging cycle (e.g., 1 second to 2 seconds) during the corresponding PTW time (e.g., 2 to 5 seconds) or if the PTW is not received within the S1AP paging message.

As a result, the MME/SGSN may calculate an occasion when UE reachability notification is reported as in Equation 4 as in "t=T−a maximum response time−signaling latency." In this case, "t" indicates the occasion when the UE reachability notification is reported. "T" indicates the paging occasion of the UE.

That is, the MME/SGSN detects whether the UE is reachable and transmits UE reachability notification to the SCEF as in step S2503 at the occasion "t" when the UE reachability notification is reported.

As described above, the maximum response time included in the monitoring request message may be used to determine that how fast must the UE reachability notification be reported to the SCS/AS (i.e., "t" occasion) prior to the next paging occasion "T" of the UE.

Machine-Type Communication (MTC)

FIG. 7 is a diagram exemplifying a machine-type communication (MTC) architecture in a wireless communication system to which the present invention can be applied.

An end-to-end application between the UE (or MTC UE) used for the MTC and an MTC application may adopt services provided in the 3GPP system and the optional services provided to an MTC server. The 3GPP system may provide transport and communication services (including 3GPP bearer services, IMS, and SMS) including various optimizations to facilitate the MTC.

FIG. 7 illustrates that the UE used for the MTC is connected to a 3GPP network (UTRAN, E-UTRAN, GERAN, I-WLAN, etc.) through an Um/Uu/LTE-Uu interface. The architecture of FIG. 7 includes various MTC models (Direct, Indirect, and Hybrid models).

First, entities illustrated in FIG. 7 will be described.

In FIG. 7, the application server is a server on the network where the MTC application is executed. Techniques for implementing various MTC applications described above may be applied to the MTC application server and a detailed description thereof will be omitted. Further, in FIG. 7, the MTC application server may access the MTC server through a reference point API, and a detailed description thereof will be omitted. Alternatively, the MTC application server may be collocated with the MTC server.

The MTC server (e.g., an SCS server in FIG. 7) is a server on the network that manages the MTC terminal and may communicate with the UE and PLMN nodes connected to the 3GPP network and used for the MTC.

An MTC-interworking function (MTC-IWF) may manage interworking between the MTC server and an operator core network and act as a proxy for the MTC operation. In order to support an MTC indirect or hybrid model, the MTC-IWF may relay or interpret a signaling protocol on a reference point Tsp to enable a specific function in the PLMN. The MTC-IWF performs a function of authenticating the MTC server before the MTC server establishes communication with the 3GPP network, a function of authenticating a control plane request from the MTC server, various functions related to a trigger instruction described later, etc.

Short Message Service-Service Center (SMS-SC)/Internet Protocol Short Message GateWay (IP-SM-GW) may manage transmission and reception of the short message service (SMS). The SMS-SC may be responsible for relaying, storing, and delivering short messages between a short message entity (SME) (an entity transmitting or receiving short messages) and the UE. The IP-SM-GW may take charge of protocol interoperability between a IP-based UE and the SMS-SC.

Charging data function (CDF)/charging gateway function (CGF) may perform charging-related operations.

The HLR/HSS may serve to store subscriber information (IMSI, etc.), routing information, configuration information, etc., and provide the subscriber information (IMSI, etc.), routing information, configuration information, etc., to the MTC-IWF.

The MSC/SGSN/MME may perform control functions including mobility management, authentication, resource allocation, etc., for network connection of the UE. The MSC/SGSN/MME may perform a function of receiving the trigger instruction from the MTC-IWF and processing the received trigger instruction in the form of the message to be provided to the MTC UE in association with the triggering described later.

The gateway GPRS support node (GGSN)/serving-gateway (S-GW)+packet date network-gateway (P-GW) may perform a gateway function of taking charge of connection between a core network and an external network.

In Table 2, main reference points in FIG. 7 are summarized.

exposes services and capabilities thereof provided by the 3GPP network interface to an external third party service provider application.

A service capability exposure function (SCEF) is a core entity within the 3GPP architecture for the service capability exposure that provides a means for securely exposing the services and capabilities provided by 3GPP network interface. In other words, the SCEF is a key entity for providing service functions belonging to a trust domain operated by a mobile communication provider. The SCEF provides API interfaces to third party service providers and provides 3GPP service functions to third party service providers through connections with various entities of 3GPP. The SCEF may be provided by the SCS.

When a Tsp function may be exposed through the application program interface (API), the MTC-IWF may be co-located with the SCEF. A protocol (e.g., DIAMETER, RESTful APIs, XML over HTTP, etc.) is selected to specify a new 3GPP interface depending on multiple factors and herein, the multiple factors include the facilitation of exposure of requested information, and need of a specific interface, but is not limited thereto.

FIG. 9 is a diagram illustrating a network trigger service request procedure in a wireless communication system to which the present invention may be applied.

1. When downlink data from an external network arrives at the P-GW, the P-GW delivers the downlink data to the S-GW.

2. If a downlink S1 bearer has been released (i.e., ECM-IDLE state) and thus the downlink data cannot be transmitted to an eNB (i.e., if an "S1 eNB TEID" value is not present in the S-GW), the S-GW buffers the received downlink data. Furthermore, the S-GW transmits a downlink data notifica-

TABLE 2

| Reference point | Description |
|---|---|
| Tsms | Reference point used for an entity outside the 3GPP system to communicate with the MTC UE via the SMS |
| Tsp | Reference point used for the entity outside the 3GPP system to communicate with the MTC-IWF in association with control plane signaling |
| T4 | Reference point used by the MTC-IWF to route device triggers to the SMS-SC of the HPLMN |
| T5a | Reference point between the MTC-IWF and a serving SGSN |
| T5b | Reference point between the MTC-IWF and a serving MME |
| T5c | Reference point between the MTC-IWF and a serving MSC |
| S6m | Reference point used by the MTC-IWF to inquire identification information (E.164 Mobile Station International Subscriber Directory Number (MSISDN) or IMSI mapped to an external identifier) of the UE and to collect UE accessibility and configuration information |

In Table 2, at least one of the reference points T5a, T5b, and T5c is referred to as T5.

Meanwhile, user plane communication with the MTC server in the case of the indirect and hybrid models and communication with the MTC application server in the case of the direct and hybrid models may be performed using the existing protocol through the reference points Gi and SGi.

Specific details related to the contents described in FIG. 7 may be incorporated into the present document by reference of 3GPP TS 23.682 document.

FIG. 8 exemplifies an architecture for service capability exposure in a wireless communication system to which the present invention can be applied.

The architecture for the service capability exposure illustrated in FIG. 8 illustrates that the 3GPP network securely tion message to the MME/SGSN with which a corresponding UE has been registered for a signaling connection and bearer configuration for the corresponding UE.

The MME/SGSN transmits a downlink data notification ACK message to the S-GW as a response to the downlink data notification message.

3. The MME/SGSN transmits a paging message to all of eNBs/RNCs (or base station controller (BSC)) belonging to a tracking area that has most been registered by the UE.

4. When the eNB/RNC (or BSC) receives the paging message from the MME/SGSN, the eNB/RNC (or BSC) broadcasts the paging message.

5. The UE that has recognized that there is downlink data intended therefor configures an ECM connection by performing a service request procedure. That is, in this case, the service request procedure is initiated by paging transmitted by a network.

The service request procedure may be performed like the procedure of FIG. 12. When such a procedure is completed, the UE may receive the downlink data from the S-GW.

6. When the paging response is received, the S-GW transmits a "Stop Paging" message to the MME/SGSN.

When the MME/SGSN instructs the eNB/RNC (or BSC) or cells to perform paging transmission, the eNB/RNC (or BSC) calculates a paging occasion through the IMSI value of the UE and a DRX cycle and transmits a paging message at the corresponding paging occasion. If there is no response from the UE for a specific time with respect to the paging transmission, the MME considers it to be a paging transmission failure and may instruct the eNB/RNC (or BSC) or cells to perform paging retransmission.

That is, the paging retransmission is determined by the MME stage if the service request of the UE is not received. The eNB stage does not monitor whether paging is received or not or does not perform corresponding retransmission. If the MME transmits paging to many cells, the UE belongs to one of the cells and transmits the service request. Accordingly, if there is no response to the paging, the eNB may determine that a corresponding UE is not located in its own cell.

Meanwhile, if the MME/SGSN does not receive a response from the UE even after a paging repetition/retransmission procedure, the MME/SGSN notifies the S-GW of a paging failure using a downlink data notification Reject message.

When the downlink data notification Reject message is received, the S-GW may delete a buffered packet(s).

Paging

A paging procedure is used for a network to transmit paging information to a UE in the RRC_IDLE mode, to notify a UE in the RRC_IDLE/RRC_CONNECTED mode of a change of system information, to notify a UE in the RRC_IDLE/RRC_CONNECTED mode of ETWS primary notification and/or ETWS secondary notification, or to notify a UE in the RRC_IDLE/RRC_CONNECTED mode of CMAS notification.

FIG. 10 is a diagram illustrating a paging procedure in a wireless communication system to which the present invention may be applied.

Referring to FIG. 10, the MME initiates a paging procedure by transmitting an S1AP paging message to an eNB (S1401).

As described above, the position of a UE in the ECM-IDLE state is managed by the MME based on a tracking area (TA). In this case, since the UE may be registered with one or more TAs, the MME may transmit the paging message to a plurality of eNBs that cover a cell belonging to a TA(s) with which the UE has been registered. In this case, each cell may belong to one TA only, and each eNB may include cells belonging to different TAs.

In this case, the MME transmits the paging message to each eNB through an S1AP interface (or S1AP protocol). Hereinafter, this is called an "S1AP PAGING message" (or paging request).

Table 3 illustrates the S1AP paging message.

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| CSG Id List | | 0 ... 1 | | | GLOBAL | ignore |
| >CSG Id | | 1 ... <maxnoofCSGId> | 9.2.1.62 | | — | |
| Paging Priority | O | | 9.2.1.78 | | YES | ignore |
| UE Radio Capability for Paging | O | | 9.2.1.98 | | YES | ignore |

Referring to Table 3, IE/Group Name indicates the name of an information element (IE) or information element (IE) group. "M" in the Presence field indicates an IE/IE group that is a mandatory IE and that is always included in a message. "O" indicates an IE/IE group that is an optional IE and that may be included or not be included in a message. "C" indicates an IE/IE group that is a conditional IE and that is included in a message only when a specific condition is satisfied. The Range field indicates the number of times that repetitive IEs/IE groups may be repeated.

The IE type and reference field indicates the type (e.g., ENUMERATED, INTEGER, and OCTET STRING) of a corresponding IE. If there is the range of a value of a corresponding IE, the IE type and reference field indicates the range of the value.

The Criticality field indicates criticality information applied to an IE/IE group. The criticality information means information indicating that how a receiving stage should operate if the receiving stage does not understand some of or the entire IE/IE group. "-" indicates that criticality information is not applied. "YES" indicates that criticality information has been applied. "GLOBAL" indicates that a piece of criticality information is included in an IE and the repetition of a corresponding IE in common. "EACH" indicates that each repetition of an IE has unique criticality information. The Assigned Criticality field indicates actual criticality information.

An information element (IE) or IE group included in the S1AP paging message is described more specifically below.

A Message Type IE uniquely identifies a transmitted message.

The UE Identity Index value IE is used for an eNB to calculate a paging frame (PF) (e.g., UE Identity Index=UE IMSI mod 1024).

The UE Radio Capability for Paging IE for paging includes paging-specific UE radio capability information.

An eNB that has received the S1AP paging message from the MME configures a paging message (hereinafter an "RRC paging message" (or paging information)).

Table 4 illustrates an RRC paging message.

TABLE 4

```
-- ASN1START
Paging ::=                      SEQUENCE {
    pagingRecordList            PagingRecordList OPTIONAL,      -- Need ON
    systemInfoModification      ENUMERATED {true}       OPTIONAL,       -- Need ON
    etws-Indication             ENUMERATED {true}       OPTIONAL,       -- Need ON
    nonCriticalExtension        Paging-v890-IEs         OPTIONAL        -- Need OP
}
Paging-v890-IEs ::=             SEQUENCE {
    lateNonCriticalExtension    OCTET STRING            OPTIONAL,       -- Need OP
    nonCriticalExtension        Paging-v920-IEs         OPTIONAL        -- Need OP
}
Paging-v920-IEs ::=             SEQUENCE {
    cmas-Indication-r9          ENUMERATED {true}       OPTIONAL,       -- Need ON
    nonCriticalExtension        Paging-v1130-IEs        OPTIONAL        -- Need OP
}
Paging-v1130-IEs ::=            SEQUENCE {
    eab-ParamModification-r11   ENUMERATED {true}       OPTIONAL,       -- Need ON
    nonCriticalExtension        SEQUENCE { }            OPTIONAL        -- Need OP
}
PagingRecordList ::=            SEQUENCE (SIZE (1..maxPageRec)) OF PagingRecord
PagingRecord ::=                SEQUENCE {
    ue-Identity                     PagingUE-Identity,
    cn-Domain                       ENUMERATED      {ps, cs},
    ...
}
PagingUE-Identity ::=           CHOICE {
    s-TMSI                          S-TMSI,
    imsi                            IMSI,
    ...
}
IMSI ::=                        SEQUENCE (SIZE (6..21)) OF IMSI-Digit
IMSI-Digit ::=                  INTEGER (0..9)
-- ASN1STOP
```

The UE Paging Identity IE is an identity for identifying a paged UE and is indicated as one of an IMSI and an SAE temporary mobile subscriber identity (5-TMSI). The S-TMSI means an identity that may uniquely identifies a UE within one MME group.

In the case of common paging, an S-TMSI is used as a UE paging identity. In contrast, if an IMSI is used as the UE paging identity, a UE performs a Re-attach procedure when it receives paging as an IMSI value, that is, paging with an IMSI.

The Paging DRX IE is used for an eNB to calculate a paging frame (PF) if a UE uses a UE-specific DRX cycle length. The UE may specify the DRX cycle length in an Attach Request message or a tracking area update (TAU) message.

The CN Domain IE indicates whether paging has occurred in a circuit switched (CS) domain or a packet switched (PS) domain.

The tracking area identity list (TAI List) IE is used to notify an eNB of a TA to which a paging message must be broadcasted. The TAI means an identifier used to uniquely identify the TA.

The closed subscriber group (CSG) identity list (CSG ID List) IE indicates a CSG set that a UE has joined. This allows an eNB to prevent a UE from paging a UE within a CSG cell that the UE has not joined.

The Paging Priority IE indicates paging priority for paging a UE.

Referring to Table 4, one RRC paging message may carry information of multiple S1AP paging messages. That is, the RRC paging message may include multiple paging records (e.g., 16) for paging multiple UEs.

Each paging record includes a UE identity field and a CN domain field. This is content transferred from the S1AP paging message.

The system information modification (systemInfoModification) field is not transferred from the S1AP paging message and is generated by an eNB. This field is used for a UE to re-acquire a system information block (SIB) set.

The extended access barring (EAB) parameter modification (eab-ParamModification) field is used to indicate EAB parameter (SIB 14) modification.

The ETWS indication (etws-Indication) field is not transferred from the S1AP paging message and is generated by an eNB. This field is applied to a UE (ETWS capable UE) only that supports the ETWS and is used to trigger a corresponding UE so that it re-acquires an SIB 1. SIB 1 content indicates ETWS content within an SIB 10 and SIB 11 to the UE.

The CMAS indication (cmas-Indication) field is applied to a UE (CMAS capable UE) only that supports a CMAS and is used to trigger a corresponding UE so that it re-acquires the SIB 1. SIB 1 content indicates CMAS content within an SIB 12 to the UE.

The eNB that has configured the RRC paging message as described above transmits downlink control information (DCI) to which cyclic redundancy check (CRC) scrambled with a paging-RNTI (P-RNTI) has been attached to the UE in a PDCCH (S1402), and transmits an RRC paging message to the UE through a PDSCH (S1403).

That is, the eNB transfers the RRC paging message to the UE through a PCCH logical channel, a PCH transmission channel, a PDSCH physical channel.

This is described more specifically. The eNB determines a PDCCH format based on a DCI to be transmitted to the UE and attaches CRS to the DCI. The CRC is scrambled (or masked) with a unique radio network temporary identifier (RNTI) depending on the owner or usage of a PDCCH. If a PDCCH is a PDCCH for a specific UE, the CRC may be masked with a unique identifier (e.g., cell-RNTI (C-RNTI)) of a UE. Alternatively, if a PDCCH is a PDCCH for a paging message, the CRC may be masked with a paging indication identifier (e.g., a paging-RNTI (P-RNTI)).

That is, the UE monitors a PDCCH based on a P-RNTI in a subframe belonging to its own paging occasion 1412. Furthermore, when the UE detects a PDCCH masked with a P-RNTI, the UE decodes DCI transmitted on the PDCCH. The DCI indicates a PDSCH resource through which the paging message has been transmitted to the UE. Furthermore, the UE decodes an RRC paging message from the PDSCH resource indicated in the DCI.

A paging cycle 1413 may be determined in a cell-specific manner. Furthermore, the paging cycle may be determined in a UE-specific manner. Furthermore, a paging occasion 1412 is determined based on its own paging cycle 1413 and its own identity (i.e., IMSI) for each UE. Accordingly, the paging message is not transmitted to all of UEs at a paging occasion 1411 possible for the eNB, but the paging message is transmitted in line with the paging occasion of a corresponding UE. The paging occasion is described more specifically later.

A paging procedure may be used for a change of system information, to indicate whether a cell broadcast message (i.e., ETWS/CAMS warning message) has been received and to notify a change of an EAB in addition to notification regarding whether the mobile terminated (MT) call of each UE has been received.

If a UE identity (e.g., IMSI or S-TMSI) is included in any one of the paging records included in the RRC paging message (i.e., if the paging procedure is used for an MT call), the UE in the RRC_IDLE mode initiates a random access procedure in order to establish (e.g., service request transmission) an RRC connection with a network.

Furthermore, if system information modification (systemInfoModification) is included in the RRC paging message the UE re-acquires required system information using a system information acquisition procedure.

Furthermore, if ETWS indication (etws-Indication) is included in the RRC paging message and the UE supports ETWS, the UE immediately reacquires the SIB 1. That is, the UE does not wait until a next system information modification cycle boundary. Furthermore, if a scheduling information list (schedulingInfoList) included in the SIB 1 indicates that an SIB 10 is present, the UE acquires the SIB 10 based on scheduling information (schedulingInfor). Furthermore, if the scheduling information list (schedulingInfoList) included in the SIB 1 indicates that an SIB 11 is present, the UE acquires the SIB 11 based on the scheduling information (schedulingInfor).

Furthermore, if CMAS indication (cmas-Indication) is included in the RRC paging message and the UE supports CMAS, the UE immediately reacquires the SIB 1. That is, the UE does not wait until a next system information modification cycle boundary. Furthermore, if an SIB 12 indicates that a scheduling information list (schedulingInfoList) included in the SIB 1 is present, the UE acquires the SIB 12 based on the scheduling information (schedulingInfor).

As described above, if cell broadcast message (i.e., ETWS/CAMS message) indication is included in the RRC paging message, the UE receives the SIB 10, SIB 11 or SIB 12 with reference to the schedulingInfoList of the SIB 1. The received SIB 10, SIB 11 or SIB 12 is delivered to a high layer (e.g., RRC layer) of the UE. If a message identifier belonging to the cell broadcast message delivered through the SIB 10, SIB 11 or SIB 12 is included in the search list of the UE, the high layer of the UE displays the message identifier for the UE and discards it if not.

Furthermore, if the UE in the RRC_IDLE mode supports EAB and an EAB parameter modification (eab-ParamModification) field is included in the RRC paging message, the UE considers a previously stored SIB 14 to be invalid and immediately acquires the SIB 1. That is, the UE does not wait until a next system information modification cycle boundary. Furthermore, the UE reacquires the SIB 14 using a system information acquisition procedure.

A paging occasion is described below.

The 3GPP LTE/LTE-A system defines a discontinuous reception (DRX) scheme of a UE in order to minimize power consumption of the UE.

A UE using DRX monitors whether a paging message is transmitted only at one the paging occasion every paging cycle (i.e., DRX cycle).

One paging frame (PF) means a single radio frame that may include one or more paging occasions.

One paging occasion (PO) means one subframe in which a P-RNTI transmitted on a PDCCH that addresses a paging message may be present. That is, the paging occasion is defined as a specific subframe within a PF that is used for a UE to check the paging message.

The PF and PO are determined using the IMSI of the UE and a DRX value. The UE may calculate the PF and PO using its own IMSI and the DRX value. Furthermore, an eNB may calculate the PF and PO for each UE through an IMSI value received from an MME.

A DRX parameter (i.e., paging/PCCH configuration information) may be included in a common radio resource configuration ("RadioResourceConfigCommon") IE, that is, an RRC message used to specify a common radio resource configuration and transmitted. The common radio resource configuration IE may be transmitted through an RRC message, such as an RRC connection reconfiguration message or an SI message. The SI message is a message used to transmit one or more SIBs.

Furthermore, the UE may request its own DRX cycle through an Attach request or a tracking area update (TAU) request message. In this case, a DRX cycle length set that may be requested by the UE is the same as a length set use within system information.

Synchronization/Non-Synchronization Between MME and eNB

In a basic LTE (Release-8) network, a network synchronization-required condition has not been defined. Accordingly, today, many LTE networks that do not perform a network synchronization mechanism are present. Furthermore, for high accuracy of network synchronization, functional improvement of network nodes is required (e.g., MBMS, enhanced inter-cell interference coordination (eICIC), and observed time difference of arrival (OTDOA) positioning).

FIG. 11 is a diagram showing synchronization between an MME and an eNB.

Referring to FIG. 11, if the synchronization mechanism is applied, the MME and "all of" eNBs must be present within a predetermined time with a difference of the starting occasion of a hyper (H)-system frame number (SFN) being about 1-2 seconds. Such a synchronization mechanism may correspond to a required/essential condition that is newly introduced in a today's LTE network that operates without synchronization.

The introduction of such a synchronization mechanism may have an adverse effect on all of MMEs and eNBs located within a network. More specifically, in order to maintain/sustain high accuracy synchronization (synchronization within about 1-2 seconds) between the MME and the eNB, there are problems in that performance improvement of the MME and the eNB is required and system complexity is increased.

Furthermore, such a synchronization mechanism may not be an essential condition essentially necessary to perform a specific operation. For example, in a paging procedure to which eDRX has been applied, the reason why synchronization having accuracy within 1-2 seconds within an MME and an eNB is performed is to minimize or obviate the time taken for the eNB to store a paging message. That is, although the MME and the eNB are out of synchronization, they can perform a paging procedure to which eDRX has been applied.

Instead, in this case, the MME transmits downlink data notification (DDN) to the eNB as soon as it receives it from an S-GW. The eNB stores the DDN received from the MME and transmits the corresponding DDN at the paging occasion of the UE.

Accordingly, this specification proposes an eDRX timer operating procedure/method for an MME to transmit a paging message to a UE in an asynchronous LTE system in which the MME and the eNB have not been synchronized.

Method for MME to Transmit Paging in Asynchronous Environment Between MME and eNB In relation to DRX applied in the idle mode, a maximum DRX cycle that is possible in a 1024 frame structure is 10.24 seconds. Recently, in order to support DRX in the idle mode, that is, several minutes to several tens of minutes (i.e., in order to support DRX of 10.24 seconds or more), a method using/supporting a hyperframe and a method of setting a separate new timer in the NAS layer (a functional layer between the MME and the UE) and operating a DRX cycle have been discussed. As a result, a hyperframe has been introduced as a method for operating a DRX cycle of 10.24 seconds or more.

More specifically, there were a discussion/evaluation regarding the influence of an RAN-based solution and core-network-based solution based on the extension of an SFN. Furthermore, there were a discussion/evaluation regarding the influence of the necessity for paging robustness, the synchronization of a network node, and the storage of a paging message. The following contents have been determined regarding an expanded idle mode based on such evaluations.

A hyper-SFN (H-SFN) is defined in order to apply eDRX of the idle mode in Release 13. A motivation that provides the H-SFN is for allowing a UE to perform resynchronization with a Uu even without transmitting uplink signaling and for improving the power saving gain of a UE. The H-SFN is broadcasted by a cell, and each H-SFN corresponds to one SFN cycle (i.e., 10.24 seconds).

In an eDRX operation, a network is required to store paging messages for an extended time. In this case, it is preferred that the time taken for an eNB to store a paging message is avoided or minimized. In an RAN node, avoidance/minimizing in the storage of a paging message requires an MME to recognize an approximate time regarding that a UE will be reachable when.

In order for a UE to secure paging robustness when moving between cells, a network is required to provide a mechanism for minimizing the possibility of page missing occurring due to the lack of H-SFN synchronization. Although strict synchronization (such as an SFN or subframe level) is not necessary, a network requires loose H-SFN synchronization. In this case, the loose H-SFN synchronization means that synchronization for H-SFN transmission/reception must be performed (or H-SFN-synchronized) if an error of a synchronization occasion (or the starting occasion of an H-SFN) for transmitting/receiving the H-SFN is within a preset range (e.g., 1-2 seconds).—if an H-SFN timing difference between eNBs is chiefly within the range of a time window in which paging transmitted from a network to a UE is repeated, loose H-SFN synchronization can be achieved (within an extended Idle (eI) mode)-DRX cycle).

That is, the UE calculates a paging occasion, that is, its own paging reception occasion, based on a DRX cycle along with a hyperframe. When the MME receives DDN and control signaling from the S-GW, the eNB does not directly transmit an S1 paging message, calculates an approximate paging occasion of the UE, and transmits the paging message to the eNB at the corresponding occasion. Accordingly, the eNB does not need to store the paging message for a long time.

Accordingly, this specification proposes an efficient procedure in which an eNB does not need to store a paging message for a long time in a wireless system that supports extended idle mode DRX. To this end, in this specification, an MME calculates a proper time when a paging message is transmitted, and transmits the paging message at the corresponding time. Related more detailed description is given later with reference to the accompanying drawings.

FIG. 12 is a flowchart illustrating a method for the MME to operate an eDRX timer according to a first embodiment of the present invention.

Referring to the flowchart of FIG. 12, the MME receives information about the remaining time up to a next paging occasion and an eDRX cycle (or DRX cycle) from an eNB through the Attach/TAU procedure of a UE, and operates an eDRX timer (or DRX timer), thereby being capable of minimizing the time taken for the eNB to store/buffer a paging message.

1. First, the UE may make an Attach request or TAU request from the eNB and the MME. In this case, the UE may include an eDRX parameter regarding a desired eDRX cycle in the Attach Request message or TAU Request message, and may transmit the Attach Request message or TAU Request message to the MME in order to negotiate the eDRX cycle with the MME.

2. Next, the MME may permit the Attach or TAU of the UE. To this end, the MME may transmit an NAS PDU, including the Attach Accept message or the TAU Accept message, to the UE. eDRX cycle information to be applied to the UE and the MME may have been included in the Accept message.

In this case, the MME may negotiate/determine whether eDRX will be used and an eDRX cycle to be used when eDRX is used, and assistance information (Assistance info) to the eNB in order to acquire the paging occasion of the UE from the eNB.

For example, the MME may transmit the assistance information, including an indicator indicating that the eNB must notify the MME of a paging time, the ID of the UE (e.g., IMSI) necessary for the eNB to calculate the paging occasion of the UE, and an eDRX cycle to be applied, to the eNB. To this end, the MME may add a new IE in which the assistance information has been included in an S1AP message used to transmit the Attach Accept message or the TAU Accept message, and may transmit the corresponding S1AP message to the eNB.

3. Next, the eNB may transmit a paging information response (Paging Info Response) message to the MME as a response to the assistance information received from the MME. A paging time and a paging synchronization gap value may have been included in the Paging Info Response message.

In this case, the paging time means the remaining time up to a next paging occasion of the UE from the present time (or an occasion when the eNB has received the assistance information from the MME. Furthermore, a (maximum) error value between the paging occasions of other eNBs at which the paging occasion of the eNB may be considered to have been synchronized with those of other eNBs (belonging to the same paging area) may be previously configured/defined, and the paging synchronization gap value means a time error/difference value at which a frame time may be deviated between a cell/eNB as described above.

The MME may calculate an eDRX timer initial value using such a paging time and a paging synchronization gap value. For example, if the paging time is 2 minutes and the paging synchronization gap value is 10 seconds, the MME may calculate 1 minute 50 seconds (=2 minutes-10 seconds) as the eDRX timer initial value, and may recognize that the UE performs paging after the 1 minute 50 seconds.

As described above, when the MME recognizes an eDRX timer starting point through the calculated eDRX timer initial value, the MME manages/operates the eDRX timer of the UE by applying the eDRX cycle that has been negotiated with the UE/determined after the eDRX timer staring point. For example, in the case where the eDRX initial value is 5 minutes and the eDRX cycle is 10 minutes, if 5 minutes elapse from the current occasion, the MME manages/operates the eDRX timer (or paging timer) of the UE in a cycle of 10 minutes, that is, the eDRX cycle.

In the case where the MME manages/operates the eDRX timer of the UE, if the MME wants to transmit a paging message to the UE, it has only to transmit the paging message to the eNB at an occasion when the eDRX timer expires (i.e., an occasion when the paging of the UE is received). As a result, the eNB does not need to buffer/store the paging message or a long time because it transfers/transmits the paging message, received from the MME, to the UE immediately or within a very short time.

FIG. 13 is a flowchart illustrating a method for the MME to operate the eDRX timer according to a second embodiment of the present invention. The present embodiment is similar to the first embodiment, and thus the description of the first embodiment may be applied to the present embodiment identically/similarly.

Accordingly, a difference between the present embodiment and the first embodiment is chiefly described, and a redundant description is omitted.

Referring to FIG. 13, the MME receives information about the remaining time up to a next paging occasion and an eDRX cycle (or DRX cycle) from the eNB through a separate paging information request procedure, and operates an eDRX timer (or DRX timer), thereby being capable of minimizing the time taken for the eNB to store/buffer a paging message.

1. First, the UE may make an Attach request or TAU request from the eNB and the MME. In this case, in order to negotiate an eDRX cycle with the MME, the UE may include an eDRX parameter regarding a desired eDRX cycle in the Attach Request message or TAU Request message and transmit the Attach Request message or TAU Request message to the MME.

2. Next, the MME may accept the Attach or TAU of the UE. To this end, the MME may transmit an NAS PDU, including the Attach Accept message or the TAU Accept message, to the UE. eDRX cycle information to be applied by the UE and the MME may have been included in the Accept message.

3. Next, the MME may request paging information from the eNB. To this end, the MME may transmit a Paging Info Request message to the eNB. The assistance information described in the first embodiment may have been included in the Paging Info Request message. That is, the Paging Info Request message may have included the ID of the UE (e.g., IMSI) for calculating the paging occasion of the UE and the eDRX cycle to be applied, that is, the assistance information necessary for the eNB to calculate the paging occasion of the UE. Such a Paging Info Request message may have an S1AP message format.

4. Next, the eNB may transmit a Paging Info Response message to the MME as a response to the assistance information received from the MME. A paging time and a paging synchronization gap value may have been included in the Paging Info Response message.

The MME calculates an eDRX timer initial value using such a paging time and a paging synchronization gap value, and manages/operates the eDRX timer of the UE using the eDRX timer initial value and the eDRX cycle.

If the MME manages/operates the eDRX timer of the UE through the aforementioned first and second embodiments, the MME can operate the eDRX timer regardless of the idle mode/connection mode of the UE. Furthermore, if it is determined that data transmission is necessary for the UE (e.g., if DDN is received from an S-GW), the MME may store/buffer a related Paging (Request) message, and may transmit the corresponding Paging (Request) message to an eNB/cell belonging to a paging area (e.g., a tracking area) when the eDRX timer of the UE expires.

When an initial paging occasion according to an eDRX initial value expires, the MME may operate the eDRX timer by resetting the eDRX timer in an eDRX cycle. If the extended idle mode DRX of the UE has been set/negotiated through the Attach/TAU procedure, the eDRX timer managed by the MME is set by a response from the eNB. When the extended idle mode DRX is negotiated, the MME may continue to manage the eDRX timer.

An embodiment in which an MME manages/operates an eDRX timer by the support of an eNB has been described as a method for minimizing the time taken for the eNB to store/buffer a paging message. Hereinafter, there is proposed another method for minimizing the paging message storage/buffering time of an eNB.

FIG. 14 is a flowchart illustrating a method for the MME to operate the eDRX timer according to a third embodiment.

Referring to the flowchart of FIG. 14, when the MME receives DDN from the S-GW, it transmits a Paging (Request) message to an eNB. The eNB may reject the paging of the MME if the storage of a paging message until the paging occasion of a UE is impossible by taking into consideration the storage/buffering availability time of its own paging message.

1. First, the MME may receive DDN from the S-GW.
2. Next, the MME may request paging from the eNB. That is, the MME may transmit a Paging (Request) message to the eNB. In this case, the ID of the UE (e.g., IMSI) for calculating the paging occasion of the UE and an eDRX cycle to be applied as the aforementioned assistance information may have been included in the transmitted Paging (Request) message.
3. Next, the eNB may check its own paging message storage/buffering availability time. More specifically, the eNB may calculate a next paging occasion of the UE using the assistance information received from the MME, and may compare its own paging message storage/buffering availability time with the remaining time up to the next paging occasion.
4A. If the storage/buffering availability time is greater than the remaining time up to the next paging occasion of the UE, the eNB may store/buffer the paging message and then transmit the paging message to the UE at the paging occasion of the UE. That is, if the eNB checks that the paging occasion of the UE is present within the storage/buffering availability time of the paging message from an occasion when the Paging (Request) message was received (e.g., if the paging occasion of the UE is present within 10 ms (the storage/buffering availability time of the eNB) after the Paging (Request) message is received), the eNB may store/buffer the paging message and then transmit the corresponding paging message to the UE at the paging occasion of the UE.
4B. In contrast, if the storage/buffering availability time is smaller than the remaining time up to the next paging occasion of the UE (e.g., if the paging occasion of the UE is not present within 10 ms (the storage/buffering availability time of the eNB) after the Paging (Request) message is received), the eNB may transmit a paging rejection (Paging Reject) message, indicating that a paging request must be attempted again at the paging occasion of the UE, to the MME. To this end, the eNB may include a paging (available) time, that is, the remaining time up to the paging occasion of the UE, and paging retransmission time information about a paging synchronization gap value in the Paging Reject message, and may transmit the Paging Reject message to the MME.
5. The MME that has received the Paging Reject message for the paging request may check whether paging retransmission time information has been included in the received message. If the paging retransmission time information has been included in the Paging Reject message, the MME may calculate/derive the paging occasion of the UE using the paging (available) time and paging synchronization gap value included in the paging retransmission time information. When the calculated/derived paging occasion of the UE is reached, the MME may retransmit the Paging (Request) message to the eNB.

In this case, the transmission of the Paging (Request) message is considered to be first transmission not retransmission. Accordingly, if a paging response message is not received after the first transmission and thus a Paging (Request) message is retransmitted, the MME may retransmit the paging message every a multiple time of an eDRX cycle from the first transmission occasion. That is, the MME may operate an eDRX timer based on the multiple time of the eDRX cycle after the first transmission, and may retransmit the Paging (Request) message to the eNB (i.e., may retransmit the Paging (Request) message at each multiple occasion of the eDRX cycle). In this case, since the paging reception time (i.e., paging occasion) of the UE is located within the storage/buffering availability time of the eNB, the eNB does not reject the paging request from the MME and may transmit the paging message to the UE.

Meanwhile, if the MME transmits a Paging (Request) message to a plurality of eNB/cells, for simplicity, at step 4B, a representative eNB that transmits a Paging Reject message to the MME may be designated. In this case, it is a prerequisite that the eNBs/cells must be synchronized as a condition for designating the representative eNB.

More specifically, if each of all of the eNBs/cells within a paging area (e.g., tracking area) transmits the Paging Reject message to the MME, signaling overhead and procedure complexity are increased. In order to reduce such overhead and procedure complexity, this specification proposes that one representative eNB that belonging to the eNBs/cells that have been synchronized and that will transmit the Paging Reject message is designated. Accordingly, if the MME transmits the Paging (Request) message to the plurality of eNBs/cells, the representative eNB may perform step 4A-5 instead of other eNBs. In this case, other eNBs not designated as the representative eNB do not transmit the Paging Reject message, and may discard the Paging (Request) message received from the MME without transmitting it to the UE.

The representative eNB may have been previously designated. The MME may include an identifier, indicating whether an eNB that receives a corresponding message is a representative eNB, in the Paging (Request) message, and may transmit the Paging (Request) message in order to indicate the previously designated representative eNB.

It may be more efficient to apply the first and the second embodiments to a UE having high data transmission/reception frequency and to apply the third embodiment to a UE having low data transmission/reception frequency.

FIG. 15 is a flowchart illustrating an operating method of the MME according to an embodiment of the present invention. In relation to this flowchart, the description related to FIGS. 12 to 14 may be applied identically/similarly, and a redundant description is omitted. Furthermore, it is assumed that in a wireless system to which this flowchart is applied, the MME has not been synchronized with an evolved_nodeB (eNB).

First, the MME may transmit assistance information to the eNB (S1510).

The ID of a UE and an eDRX cycle may have been included in the assistance information. The assistance information may be included in an Attach Accept message in an attach procedure or a TAU Accept message within a TAU procedure as in FIG. 12, and may be transmitted. In this case, the assistance information may be included in the ID of an S1AP message used to transmit the Attach Accept message or the TAU Accept message, and may be transmitted. Alternatively, the assistance information may be included in a separate Paging Info Request message as in FIG. 13, and may be transmitted.

Next, the MME may receive a Paging Info Response message from the eNB as a response to the assistance information (S1520). In this case, the remaining time up to a next paging occasion of the UE calculated based on the assistance information and belonging to a paging hyperframe (PH) may have been included in the Paging Info Response message. Furthermore, according to embodiments, a paging synchronization gap value, that is, a maximum error value between the paging occasions of eNBs at which the paging occasion of the eNB may be considered to be synchronized with those of other eNBs, may have been further included in the Paging Info Response message.

Next, the MME may set the remaining time up to a next paging occasion of the UE as an eDRX timer initial value, and may transmit a paging message to the eNB when the eDRX timer expires (S1530). Furthermore, although not shown in this flowchart, when the eDRX timer set as the eDRX timer initial value expires, the MME may set the eDRX timer as an eDRX cycle again.

FIG. 16 is a flowchart illustrating an operating method of the MME according to an embodiment of the present invention. In relation to this flowchart, the description related to FIGS. 12 to 14 may be applied identically/similarly, and a redundant description is omitted. Furthermore, it is assumed that in a wireless system to which this flowchart is applied, the MME has not been synchronized with an evolved_nodeB (eNB).

First, the MME may receive DDN from the S-GW (S1610).

Next, the MME may transmit a paging request message to the eNB (S1620). Assistance information about the ID of a UE and an eDRX cycle may have been included in the paging request message.

Next, when the MME receives a Paging Reject message from the eNB, it may set an eDRX timer initial value. When the eDRX timer expires, the MME may transmit the paging message to the eNB (S1630).

In this case, the remaining time up to a next paging occasion of the UE belonging to a paging hyperframe (PH) may have been included in the Paging Reject message. In this case, the MME may set the remaining time, acquired through the Paging Reject message, as an eDRX timer initial value, and may transmit the paging message to the eNB when the set eDRX timer expires. Furthermore, a paging synchronization gap value, that is, a maximum error value between the paging occasions of eNBs at which the paging occasion of the eNB may be considered to be synchronized with those of other eNBs, may have been further included in the Paging Reject message.

In this case, the Paging Reject message may be transmitted based on the paging message storage availability time of the eNB. More specifically, when the eNB receives the paging message from the MME, it may compare the remaining time up to a next paging occasion of the UE with its own paging message storage availability time. If the remaining time is smaller than the storage availability time, the eNB may store the paging message, and may transmit the paging message stored at the next paging occasion of the UE to the UE. In contrast, if the remaining time is greater than the storage availability time, the eNB may transmit a Paging Reject message to the MME.

Meanwhile, if the MME transmits the paging request message to other eNBs whose paging occasions have been synchronized with that of the eNB, the eNB that transmits the Paging Reject message may correspond to a representative eNB representing other eNBs and that transmits the Paging Reject message.

Overview of Devices to which the Present Invention can be Applied

FIG. 17 illustrates a block diagram of a communication device according to one embodiment of the present invention.

With reference to FIG. 17, a wireless communication system comprises a network node 1710 and a plurality of UEs 1720.

A network node 1710 comprises a processor 1711, memory 1712, and communication module 1713. The processor 1711 implements proposed functions, processes and/or methods proposed through FIG. 1 to FIG. 16. The processor 1711 can implement layers of wired/wireless interface protocol. The memory 1712, being connected to the processor 1711, stores various types of information for driving the processor 1711. The communication module 1713, being connected to the processor 1711, transmits and/or receives wired/wireless signals. Examples of the network node 1710 include an eNB, MME, HSS, SGW, PGW, application server and so on. In particular, in case the network node 1710 is an eNB, the communication module 1713 can include a Radio Frequency (RF) unit for transmitting/receiving a radio signal.

The UE 1720 comprises a processor 1721, memory 1722, and communication module (or RF unit) 1723. The processor 1721 implements proposed functions, processes and/or methods proposed through FIG. 1 to FIG. 16. The processor 1721 can implement layers of wired/wireless interface protocol. The memory 1722, being connected to the processor 1721, stores various types of information for driving the processor 1721. The communication module 1723, being connected to the processor 1721, transmits and/or receives wired/wireless signals.

The memory 1712, 1722 can be installed inside or outside the processor 1711, 1721 and can be connected to the processor 1711, 1721 through various well-known means. Also, the network node 1710 (in the case of an eNB) and/or the UE 1720 can have a single antenna or multiple antennas.

FIG. 18 illustrates a block diagram of a wireless communication apparatus according to an embodiment of the present invention.

Particularly, in FIG. 18, the UE described above FIG. 17 will be exemplified in more detail.

Referring to FIG. 18, the UE includes a processor (or digital signal processor) 1810, RF module (RF unit) 1835, power management module 1805, antenna 1840, battery 1855, display 1815, keypad 1820, memory 1830, Subscriber Identification Module (SIM) card 1825 (which may be optional), speaker 1845 and microphone 1850. The UE may include a single antenna or multiple antennas.

The processor 1810 may be configured to implement the functions, procedures and/or methods proposed by the present invention as described in FIG. 1-17. Layers of a wireless interface protocol may be implemented by the processor 1810.

The memory 1830 is connected to the processor 1810 and stores information related to operations of the processor 1810. The memory 1830 may be located inside or outside the processor 1810 and may be connected to the processors 1810 through various well-known means.

A user enters instructional information, such as a telephone number, for example, by pushing the buttons of a keypad 1820 or by voice activation using the microphone 1850. The microprocessor 1810 receives and processes the instructional information to perform the appropriate function, such as to dial the telephone number. Operational data may be retrieved from the SIM card 1825 or the memory module 1830 to perform the function. Furthermore, the processor 1810 may display the instructional and operational information on the display 1815 for the users reference and convenience.

The RF module 1835 is connected to the processor 1810, transmits and/or receives an RF signal. The processor 1810 issues instructional information to the RF module 1835, to initiate communication, for example, transmits radio signals comprising voice communication data. The RF module 1835 comprises a receiver and a transmitter to receive and transmit radio signals. An antenna 1840 facilitates the transmission and reception of radio signals. Upon receiving radio signals, the RF module 1835 may forward and convert the signals to baseband frequency for processing by the processor 1810. The processed signals would be transformed into audible or readable information outputted via the speaker 1845.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

MODE FOR INVENTION

Various forms for implementing the present invention have been described in the best mode for implementing the present invention.

INDUSTRIAL APPLICABILITY

In a wireless communication system of the present invention, an example in which a location area updating method and/or a paging area managing method are/is applied to a 3GPP LTE/LTE-A system is primarily described, but can be applied to various wireless communication systems in addition to the 3GPP LTE/LTE-A system.

The invention claimed is:

1. A method for a mobility management entity (MME) to transmit a paging message to a user equipment (UE) in a hyper (H)-system frame number (SFN) non-synchronization situation in which H-SFN starting occasions of the MME and an evolved_nodeB (eNB) have been spaced at a preset range or more in a wireless communication system, the method comprising:
   transmitting, to the eNB, assistance information comprising an identifier of the UE and an extended discontinuous reception (eDRX) cycle;
   receiving, from the eNB, a paging information response message as a response to the assistance information, wherein the paging information response message comprises a remaining time up to a next paging occasion of the UE calculated based on the assistance information; and
   setting the remaining time as an eDRX timer initial value and transmitting the paging message to the eNB when the eDRX timer expires,
   wherein the paging information response message further comprises a paging synchronization gap value which is a maximum error value between paging occasions of eNBs at which a paging occasion of the eNB is capable of being considered to have been synchronized with paging occasions of other eNBs.

2. The method of claim 1, wherein, when the remaining time and the paging synchronization gap value are received through the paging information response message, the transmitting the paging message to the eNB includes of setting the eDRX timer initial value by taking into consideration the remaining time and the paging synchronization gap value and transmitting the paging message to the eNB when the eDRX timer expires.

3. The method of claim 1, wherein the assistance information is included in an attach accept message within an attach procedure or a tracking area update (TAU) accept message within a TAU procedure and transmitted to the eNB.

4. The method of claim 3, wherein the assistance information is included in an information element (IE) of an S1AP message used to transmit the attach accept message or the TAU accept message and transmitted to the eNB.

5. The method of claim 1, wherein the assistance information is included in a paging information request message and transmitted to the eNB.

6. The method of claim 1, further comprising:
   resetting the eDRX timer as the eDRX cycle when the eDRX timer set as the eDRX timer initial value expires.

* * * * *